(12) United States Patent
Behboudikhiavi et al.

(10) Patent No.: US 10,865,493 B2
(45) Date of Patent: Dec. 15, 2020

(54) SYNTHESIS OF LITHIUM MANGANESE DIOXIDE MICRO/NANOSTRUCTURES

(71) Applicants: Sepideh Behboudikhiavi, Tabriz (IR); Mehran Javanbakht, Tehran (IR); Sayed Ahmad Mozaffari, Tehran (IR); Mehdi Ghaemi, Gorgan (IR)

(72) Inventors: Sepideh Behboudikhiavi, Tabriz (IR); Mehran Javanbakht, Tehran (IR); Sayed Ahmad Mozaffari, Tehran (IR); Mehdi Ghaemi, Gorgan (IR)

( * ) Notice: Subject to any disclaimer, the term of this patent is extended or adjusted under 35 U.S.C. 154(b) by 297 days.

(21) Appl. No.: 16/109,407

(22) Filed: Aug. 22, 2018

(65) Prior Publication Data

US 2019/0136400 A1    May 9, 2019

Related U.S. Application Data

(60) Provisional application No. 62/548,408, filed on Aug. 22, 2017.

(51) Int. Cl.

| | |
|---|---|
| *C25D 9/06* | (2006.01) |
| *C01G 45/12* | (2006.01) |
| *H01M 4/505* | (2010.01) |
| *H01M 4/525* | (2010.01) |
| *C25D 13/02* | (2006.01) |
| *C25D 13/18* | (2006.01) |

(52) U.S. Cl.
CPC ........... *C25D 9/06* (2013.01); *C01G 45/1228* (2013.01); *C25D 13/02* (2013.01); *C25D 13/18* (2013.01); *H01M 4/505* (2013.01); *H01M 4/525* (2013.01); *C01P 2004/03* (2013.01); *C01P 2004/16* (2013.01); *C01P 2004/24* (2013.01); *C01P 2004/32* (2013.01); *C01P 2006/12* (2013.01); *C01P 2006/16* (2013.01); *C01P 2006/17* (2013.01); *C01P 2006/40* (2013.01)

(58) Field of Classification Search
CPC ........................................................ C25D 9/06
USPC .................................................. 205/333, 107
See application file for complete search history.

(56) References Cited

U.S. PATENT DOCUMENTS

| | | | |
|---|---|---|---|
| 6,319,384 B1 | 11/2001 | Taylor et al. | |
| 6,699,297 B1 * | 3/2004 | Yamawaki | C01G 45/1228 29/623.1 |
| 2009/0223827 A1 | 9/2009 | Herdman et al. | |
| 2013/0220819 A1 | 8/2013 | Hall et al. | |

* cited by examiner

*Primary Examiner* — Brian W Cohen
(74) *Attorney, Agent, or Firm* — Bajwa IP Law Firm; Haris Zaheer Bajwa

(57) ABSTRACT

A method for synthesizing mesoporous lithium manganese dioxide micro/nanostructures, in accord with an implementation, includes preparing an aqueous metal salt solution by dissolving a lithium ion source and a manganese ion source in water, and subjecting the aqueous metal salt solution to an anodic electrodeposition process. The anodic electrodeposition process may include transferring the aqueous metal salt solution to an electrodeposition bath comprising an anode electrode and a cathode electrode, such that the anode electrode and the cathode electrode are immersed in the transferred aqueous metal salt solution, and applying a pulse reverse current through the electrodeposition bath to obtain lithium manganese dioxide deposited on a surface of the anode electrode.

18 Claims, 41 Drawing Sheets

SYNTHESIS OF LITHIUM MANGANESE DIOXIDE MICRO/NANOSTRUCTURES

CROSS-REFERENCE TO RELATED APPLICATION

This application claims the benefit of priority from U.S. Provisional Patent Application Ser. No. 62/548,408, filed on Aug. 22, 2017, and entitled "A SYNTHESIS METHOD OF LITHIUM MANGANESE DIOXIDE MICRO/NANO-STRUCTURES," which is incorporated herein by reference in its entirety.

TECHNICAL FIELD

The present disclosure generally relates to lithium manganese dioxide structures, and particularly to a method for synthesizing lithium manganese dioxide structures.

BACKGROUND

Lithium ion batteries are used in small-size electric and electronic devices, such as cellular phones, laptops and so forth due to their long lifetime and high energy density. In addition, Li-ion batteries may be used as power sources of electric vehicles with the capability of meeting high energy, large volume density, long life cycle and high safety demands of these vehicles.

Utilizing Li-ion batteries in electric vehicles requires a cost-effective and high-performance cathode material. Lithium manganese dioxide cathode materials may satisfactorily fulfill these requirements due to their low-cost, abundant sources, environmental compatibility, increased safety to overcharge conditions, and higher discharge capacity. Lithium manganese dioxide cathode materials may reduce the cost of ultimate Li-ion batteries.

Among various structures of lithium manganese dioxide-based materials, orthorhombic lithium manganese dioxide (O—$Li_xMnO_2$, $0<x<1$) with a theoretical discharge capacity of 285 mAh/g and relatively good cycleability would be an advantageous option compared to the spinel type lithium manganese dioxide with inferior discharge capacity and cyclic stability. However, a relatively severe capacity fade of O—$LiMnO_2$ during successive charge-discharge cycles hinders the use of this material in the large-scale Li-ion batteries. Solid-state reaction, sol-gel, and hydrothermal methods are commonly utilized for O—$Li_xMnO_2$ synthesis. However, complex conditions of the synthesis under sealed environment and high temperatures in the hydrothermal method, and also multi-step procedures of the aforementioned synthesis methods make these methods time-consuming and costly. Furthermore, desired tuning of chemical and physicochemical properties of the synthesized material would be difficult and costly because of the complex reaction media and lower number of available reaction variables which could be manipulated.

There is, therefore a need for a simple and cost-effective synthesis strategy for synthesizing mesoporous lithium manganese dioxide micro/nanostructures with the capability of efficiently controlling $Li_xMnO_2$ properties to achieve a cathode material with high electrochemical performance.

SUMMARY

In one general aspect, a method for synthesizing mesoporous lithium manganese dioxide micro/nanostructures as disclosed may include preparing an aqueous metal salt solution by dissolving a lithium ion source and a manganese ion source in water, and subjecting the aqueous metal salt solution to an anodic electrodeposition process. The anodic electrodeposition process may include transferring the aqueous metal salt solution to an electrodeposition bath containing an anode electrode and a cathode electrode, such that the anode electrode and the cathode electrode becomes immersed in the transferred aqueous metal salt solution, and applying a pulse reverse current through the electrodeposition bath to obtain lithium manganese dioxide deposited on a surface of the anode electrode.

According to some implementations, applying the pulse reverse current through the electrodeposition bath may include applying a modulated pulse reverse current with an anodic duty cycle adjustable between 20% and 90%, a cathodic duty cycle adjustable between 3% and 50%, and a frequency adjustable between 5 Hz and 500 Hz.

According to some implementations, applying the modulated pulse reverse current may include applying the modulated pulse reverse current with an adjustable anodic pulse width of between 5 μs and 100 ms and an adjustable cathodic pulse width of between 1 μs and 95 ms.

According to some implementations, applying the modulated pulse reverse current may include applying the modulated pulse reverse current with an adjustable anodic peak current density and an adjustable cathodic peak current density of between 100 $\mu Adm^{-2}$ and 10 $Adm^{-2}$.

According to one or more implementations, subjecting the aqueous metal salt solution to the anodic electrodeposition process further may include concurrently stirring the aqueous metal salt solution in the electrodeposition bath. Stirring the aqueous metal salt solution in the electrodeposition bath may include stirring the aqueous metal salt solution in the electrodeposition bath with a speed of 20 to 600 rpm.

According to one or more implementations, the method for synthesizing mesoporous lithium manganese dioxide micro/nanostructures may further include adjusting pH of the aqueous metal salt solution to between 2.0 and 6.5.

According to one or more implementations, the method for synthesizing mesoporous lithium manganese dioxide micro/nanostructures may further include removing the obtained lithium manganese dioxide from the surface of the anode electrode.

According to one or more implementations, the method for synthesizing mesoporous lithium manganese dioxide micro/nanostructures may further include a two-step heat treatment of the obtained lithium manganese dioxide at a first temperature in a range of 100° C. to 200° C., followed by increasing the first temperature to a second temperature with a slope of between 1° C./min. and 10° C./min., and heating the obtained lithium manganese dioxide at the second temperature in a range of 300° C. to 500° C.

According to some implementations, heating the obtained lithium manganese dioxide at the first temperature in a range of 100° C. to 200° C. may include heating the obtained lithium manganese dioxide at the first temperature in a range of 100° C. to 200° C. for a first period of 60 min. to 12 h.

According to some implementations, applying the pulse reverse current through the electrodeposition bath may include applying the pulse reverse current through the electrodeposition bath for a period of 30 min to 24 hours.

According to one or more implementations, the lithium salt may be selected from the group consisting of lithium hydroxide, lithium carbonate, lithium sulfate, lithium nitrate, lithium bromide, lithium chloride, lithium perchlorate, lithium acetate, lithium oxalate, and combinations thereof. According to other implementations, the manganese salt may be selected from the group consisting of manganese bromide, manganese carbonate, manganese chloride, manganese nitrate, manganese sulfate, manganese perchlorate, manganese acetate and manganese oxalate, and combinations thereof.

According to some implementations, adjusting pH of the aqueous metal salt solution between 2.0 and 6.5 may include adding a specific amount of an acid solution, the acid solution selected from the group consisting of sulfuric acid, hydrochloric acids, acetic acid, perchloric acid, and combinations thereof.

According to some implementations, the cathode electrode may include a sheet made of any one of lead, stainless steel, graphite, platinum, gold, and gold-coated substrates. The anode electrode may include a sheet made of any one of titanium, stainless steel, platinum, platinum-coated substrates, gold, and gold-coated substrates.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

As discussed above, there is a need for a simpler synthesis method for synthesizing mesoporous lithium manganese dioxide micro/nanostructures that allows for a facile control over the properties of the synthesized mesoporous lithium manganese dioxide. The present disclosure discloses a synthesis method for mesoporous lithium manganese dioxide structures based on a pulse reverse electrodeposition method. The pulse reverse electrodeposition method allows for synthesizing the mesoporous lithium manganese dioxide structures in a one-pot synthesis procedure within an additive-free electrolyte without any requirement for organic additives, surfactants, or mesoporous silica templates, while providing the possibility of controlling the electrochemical properties of the synthesized structures via manipulating the parameters of the synthesis procedure.

The methods and techniques disclosed herein are directed to synthesizing mesoporous lithium manganese dioxides ($Li_xMnO_2$, $0<x<1$) with orthorhombic-gamma structures that are capable of offering high discharge capacity as well as high cycle life as a positive active material of Li-ion batteries. The lithium ion content, BET specific surface area, average diameter of mesopores, and the morphology of the provided mesoporous lithium manganese dioxide micro/nanostructures may be tuned to achieve a desirable discharge capacity and cycle life merely by modulating the pulse reverse current parameters within a given range.

Figure 1:
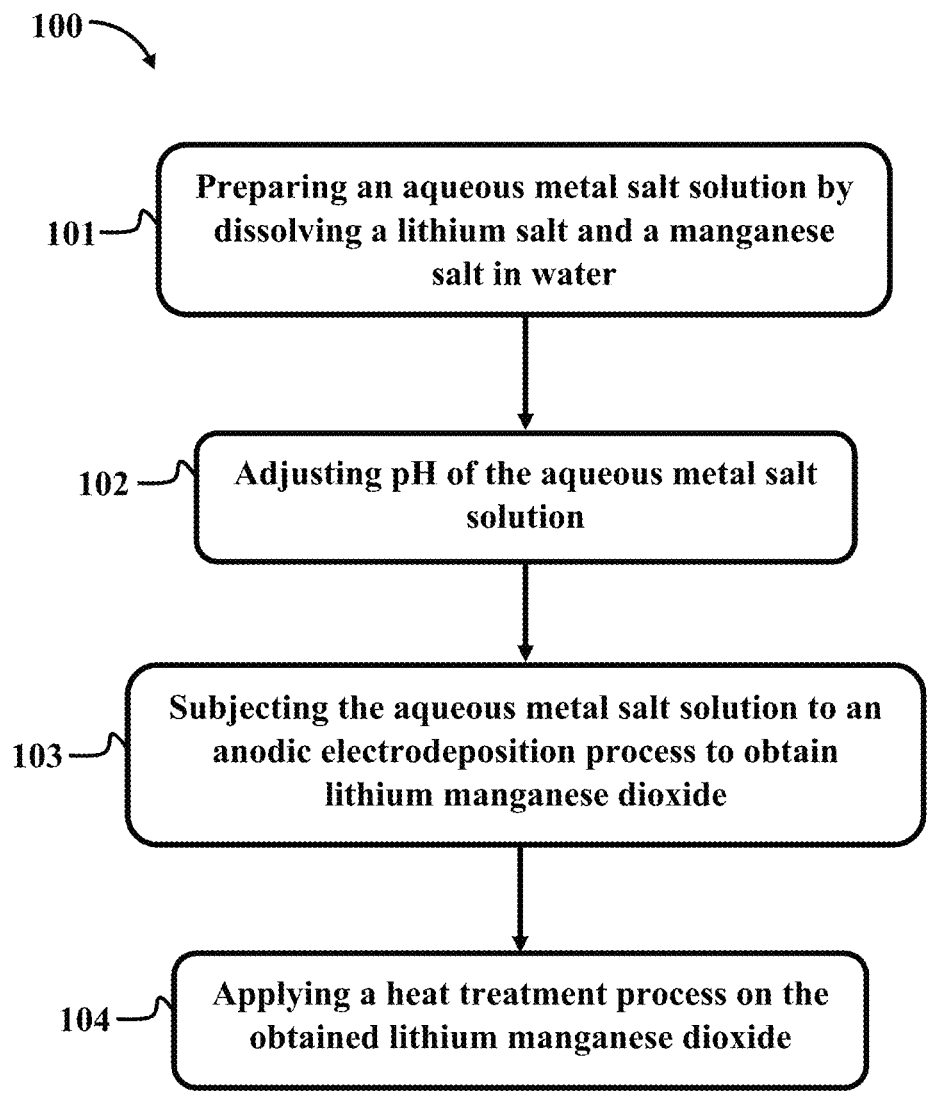
FIG. 1 illustrates a flowchart of an implementation of a method for synthesizing mesoporous lithium manganese dioxide micro/nanostructures.

FIG. 1 illustrates a flowchart of an implementation of a method 100 for synthesizing mesoporous lithium manganese dioxide micro/nanostructures. The method 100 may include a step 101 of preparing an aqueous metal salt solution by dissolving a lithium salt and a manganese salt in water; a step 102 of adjusting pH of the aqueous metal salt solution; a step 103 of subjecting the aqueous metal salt solution to an anodic electrodeposition process to obtain lithium manganese dioxide; and a step 104 of applying a heat treatment process on the obtained lithium manganese dioxide.

Referring to FIG. 1, according to one or more implementations, the step 101 of preparing the aqueous metal salt solution by dissolving a lithium salt and a manganese salt in water may include dissolving a lithium ion source such as lithium hydroxide, lithium carbonate, lithium sulfate, lithium nitrate, lithium bromide, lithium chloride, lithium perchlorate, lithium acetate, lithium oxalate and combinations thereof, and a manganese ion source such as manganese bromide, manganese carbonate, manganese chloride, manganese nitrate, manganese sulfate, manganese perchlorate, manganese acetate and manganese oxalate and combinations thereof. According to an implementation the lithium salt:manganese salt ratio may be approximately 1:20.

The step 102 of adjusting pH of the aqueous metal salt solution may include adjusting the pH of the aqueous metal salt solution by adding predetermined amounts of an acid, such as sulfuric acid, hydrochloric acids, acetic acid, perchloric acid and combinations thereof. The pH of the aqueous metal salt solution may be adjusted between 2.0 and 6.5.

Still referring to FIG. 1, according to one or more implementations, the step 103 of subjecting the aqueous metal salt solution to an anodic electrodeposition process may include transferring the aqueous metal salt solution to an electrodeposition bath containing an anode electrode and a cathode electrode, such that the anode electrode and the cathode electrode are immersed in the aqueous metal salt solution, and then applying a pulse reverse current through the electrodeposition bath to obtain lithium manganese dioxide. The obtained lithium manganese dioxide is deposited on a surface of the anode electrode.

According to an implementation, the anode electrode may be a metal sheet made of for example, titanium, stainless steel, platinum, platinum-coated substrates, gold, and gold-coated substrates. The cathode electrode may include at least one sheet made of for example, lead, stainless steel, graphite, platinum, platinum-coated substrates, gold, and gold-coated substrates. In an implementation, the anode electrode may be a metal sheet surrounded by a couple of cathode electrodes.

According to an implementation, the electrodeposition bath may further include a thermostat to keep the temperature of the electrolyte constant from about 20° C. to about 150° C. In some implementations, the thermostat may be utilized to keep the temperature of the electrolyte constant from about 70° C. to about 100° C.

According to some implementations, applying a pulse reverse current through the electrodeposition bath to obtain lithium manganese dioxide may include applying a pulse reverse current through the electrodeposition cell for a predetermined time. The pulse reverse current may include a modulated pulse reverse current which functions as a driving force of the anodic electrodeposition process. In an example, the pulse reverse current may have a waveform that includes consecutively repeated cathodic and anodic pulses with a defined frequency and duty cycle. In another example, the waveform may include multiple cathodic pulses followed by an anodic pulse and/or multiple anodic pulses followed by a cathodic pulse. According to an implementation, a predetermined switching off time for the current may be introduced in between consecutive cathodic and anodic pulses. It should be understood that current and voltage values are proportional during the anodic electrodeposition process, and considering this, all aspects in the exemplary electrodeposition processes of the present disclosure are discussed on the base of current for the sake of more simplicity.

Figure 2:
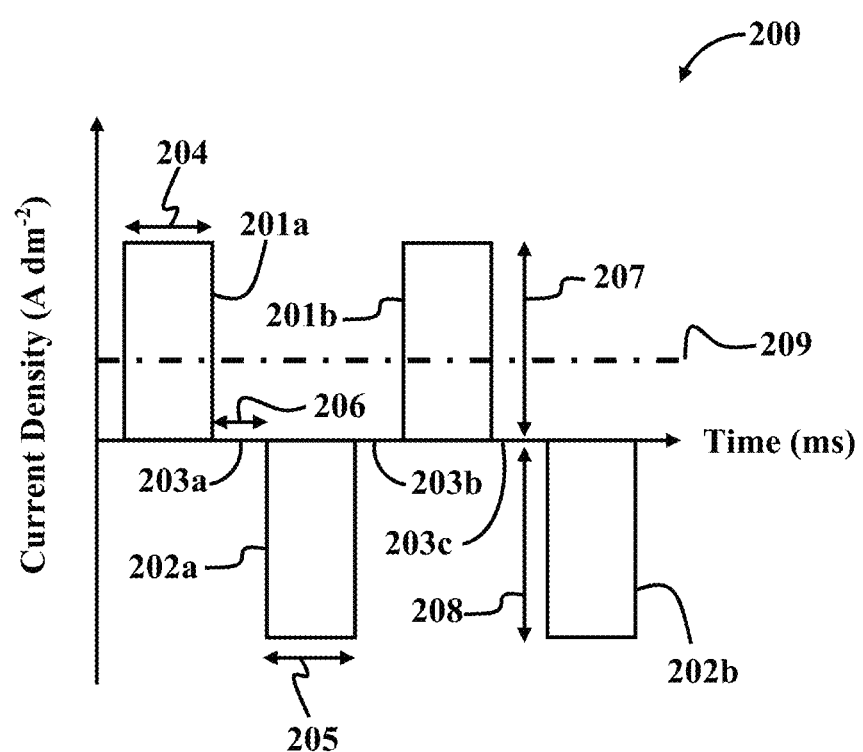
FIG. 2 illustrates an exemplary waveform of a pulse reverse current, according to an implementation of the present disclosure.

FIG. 2 illustrates an exemplary waveform 200 of a pulse reverse current (pulses of successively alternating polarity), according to an implementation of the present disclosure. Referring to FIG. 2, as mentioned before, the waveform 200 of a pulse reverse current may include consecutively repeated anodic pulses 201a-b and cathodic pulses 202a-b. The waveform 200 may further include current off times 203a-c between two consecutive cathodic and anodic pulses. For example, current off time 203a is between the anodic pulse 201a and the cathodic pulse 202a.

Referring to FIG. 2, time period 204 of applying an anodic pulse is referred to by $t_a$; time period 205 of applying a cathodic pulse is referred to by $t_c$; current off time period 206 is referred to by $t_r$, anodic peak current density 207 is referred to by $I_a$; cathodic peak current density 208 is referred to by $I_c$; and average anodic current density 209 is referred to by $\bar{I}_a$. The pulse reverse currents of different implementations of the present disclosure may be characterized with $t_a$, $t_c$, $I_a$, and $I_c$ as independent variables. The pulse reverse currents may further be characterized with duty cycle (θ) and frequency (f) as dependent variables.

According to one or more implementations, an anodic duty cycle ($\theta_a$) may be defined by Equation (1) below.

$$\theta_a = \frac{t_a}{t_a + t_c + t_r} \times 100 \quad \text{Equation (1)}$$

According to one or more implementations, frequency (f) may be defined by Equation (2) below.

$$f = \frac{1}{t_a + t_c + t_r} \quad \text{Equation (2)}$$

According to one or more implementations, average anodic current density ($\bar{I}_a$) may be defined by Equation (3) below.

$$\bar{I}_a = \frac{I_a t_a - I_c t_c}{t_a + t_c + t_r} \quad \text{Equation (3)}$$

According to one or more implementations, a cathodic duty cycle ($\theta_c$) may be defined by Equation (4) below.

$$\theta_c = \frac{t_c}{t_a + t_c + t_r} \times 100 \quad \text{Equation (4)}$$

It should be understood, for simplicity, that only a rectangular waveform of the pulse reverse current is illustrated as the waveform 200 in FIG. 2. However, the waveform of a pulse reverse current may be in any form, for example sine-wave and square wave pulses.

Referring back to FIG. 1, according to an implementation, the step 103 of subjecting the aqueous metal salt solution to an anodic electrodeposition process may include applying a pulse reverse current with adjustable parameters (e.g., $t_a$, $t_c$, $t_r$, $I_a$, $I_c$, $\bar{I}_a$, θ, and f) through the electrodeposition cell. The pulse reverse current parameters as well as the applied voltage may be adjusted to make the electrodeposition process in favor of the anodic electrodeposition of lithium manganese dioxide on the anode electrode.

According to an implementation, the anodic duty cycle ($\theta_a$) may be adjusted between approximately 20% and approximately 90%. According to some implementations, the anodic duty cycle ($\theta_a$) may be adjusted at predetermined values, for example at 37%, 40%, and 64%. According to an implementation, the cathodic duty cycle ($\theta_c$) may be adjusted between approximately 3% and approximately 50%. According to some implementations, the cathodic duty cycle ($\theta_c$) may be adjusted at predetermined values, for example at 4%, 7%, and 12%.

According to an implementation, the frequency (f) of the applied pulse reverse current may be adjusted between approximately 5 Hz and approximately 500 Hz. For example, the frequency (f) may be adjusted at 15 Hz, 145 Hz, or 265 Hz.

According to some implementations, the time period of applying the anodic pulse or otherwise the anodic pulse width ($t_a$) may be within a range of 5 μs to 100 ms and the time period of applying the cathodic pulse or otherwise the cathodic pulse width ($t_c$) may be within a range of 1 μs to 95 ms. Increasing the values of $t_a$ within the aforementioned range for constant $t_c$ and $t_r$ may enhance the specific surface areas as well as the average diameter of mesopores of the synthesized mesoporous lithium manganese dioxide. According to some implementations, $t_r$ may vary between 1 μs and 20 ms.

According to one or more implementations, $I_a$ and $I_c$ may be adjusted in a range of approximately 100 μAdm$^{-2}$ to approximately 10 Adm$^{-2}$. In an example, anodic peak current density and the cathodic current density may have equal values ($I_a$=$I_c$). In other examples, anodic and cathodic peak current densities may have different values.

Referring back to FIG. 1, according to an implementation, the step 103 of subjecting the aqueous metal salt solution to an anodic electrodeposition process may further include concurrently stirring the aqueous metal salt solution in the electrodeposition bath while the pulse reverse current with adjusted parameters passes through the aqueous metal salt solution. The aqueous metal salt solution that functions as the electrolyte in the electrodeposition process may be stirred with a stirring speed of approximately 20 rpm to approximately 600 rpm. The stirring may be carried out by for example, a magnetic stirrer, a mechanical stirrer or the like.

According to some implementations, after the electrodeposition process, the obtained lithium manganese dioxide is mechanically removed from the surface of the anode and washed with distilled water until residues of the electrolyte are removed from the obtained lithium manganese dioxide powder.

Referring to FIG. 1, according to an implementation, the step 104 of applying a heat treatment process on the obtained lithium manganese dioxide may include heating the obtained lithium manganese dioxide at a first temperature in a range of 100° C. to 200° C., followed by increasing the first temperature to a second temperature with a slope between 1° C./min and 10° C./min, and heating the obtained lithium manganese dioxide at the second temperature in a range of 300° C. to 500° C. for a period between 180 min to 14 hours. According to an implementation, heating the obtained lithium manganese dioxide at a first temperature in a range of 100° C. to 200° C. may be carried out for a period of 60 min to 12 h.

EXAMPLES

In the following examples, six different samples of lithium manganese dioxide are synthesized by a synthesis method, pursuant to the teachings of the present disclosure.

Example 1

Synthesizing $Li_{0.22}MnO_2$

In this example, $Li_{0.22}MnO_2$ is synthesized by first preparing an aqueous solution containing $Li_2SO_4$ as a lithium ion source and $MnSO_4$ as a manganese ion source with a $Li_+:Mn^{2+}$ ratio of 10:1. This ratio is kept constant throughout the anodic electrodeposition process. The pH of the prepared aqueous solution was fixed at 6 by adding appropriate amounts of a sulfuric acid solution. The prepared aqueous solution was transferred to an electrodeposition bath. The electrodeposition bath included a 316-stainless steel anode electrode surrounded by two lead cathode sheets. Here, 1.00 $dm^2$ of the anode sheet was exposed to the electrolyte. The temperature of the aqueous solution was fixed at 80° C. using a thermostatic control throughout the electrodeposition. The electrolyte solution was magnetically stirred with a speed of 100 rpm throughout the electrodeposition process. The anodic electrodeposition of lithium manganese dioxide was conducted by passing a pulse reverse current through the electrodeposition cell for 120 minutes with an adjusted anodic duty cycle of 37.5%, a frequency of 25 Hz, similar $I_a$ and $I_c$ equal to 1.00 $mAdm^{-2}$, and a $t_r$ of 20 ms. Afterwards, the deposited lithium manganese dioxide was mechanically removed from the surface of the 316-stainless steel anode and rinsed with distilled water to remove the residuals of the acidic electrolyte. Finally, the obtained powder of lithium manganese dioxide was put into a crucible and heated at 110° C. for 3 hours followed by a calcination at 375° C. with a ramping rate of 1° C./min for 3 hours.

Figure 3A:
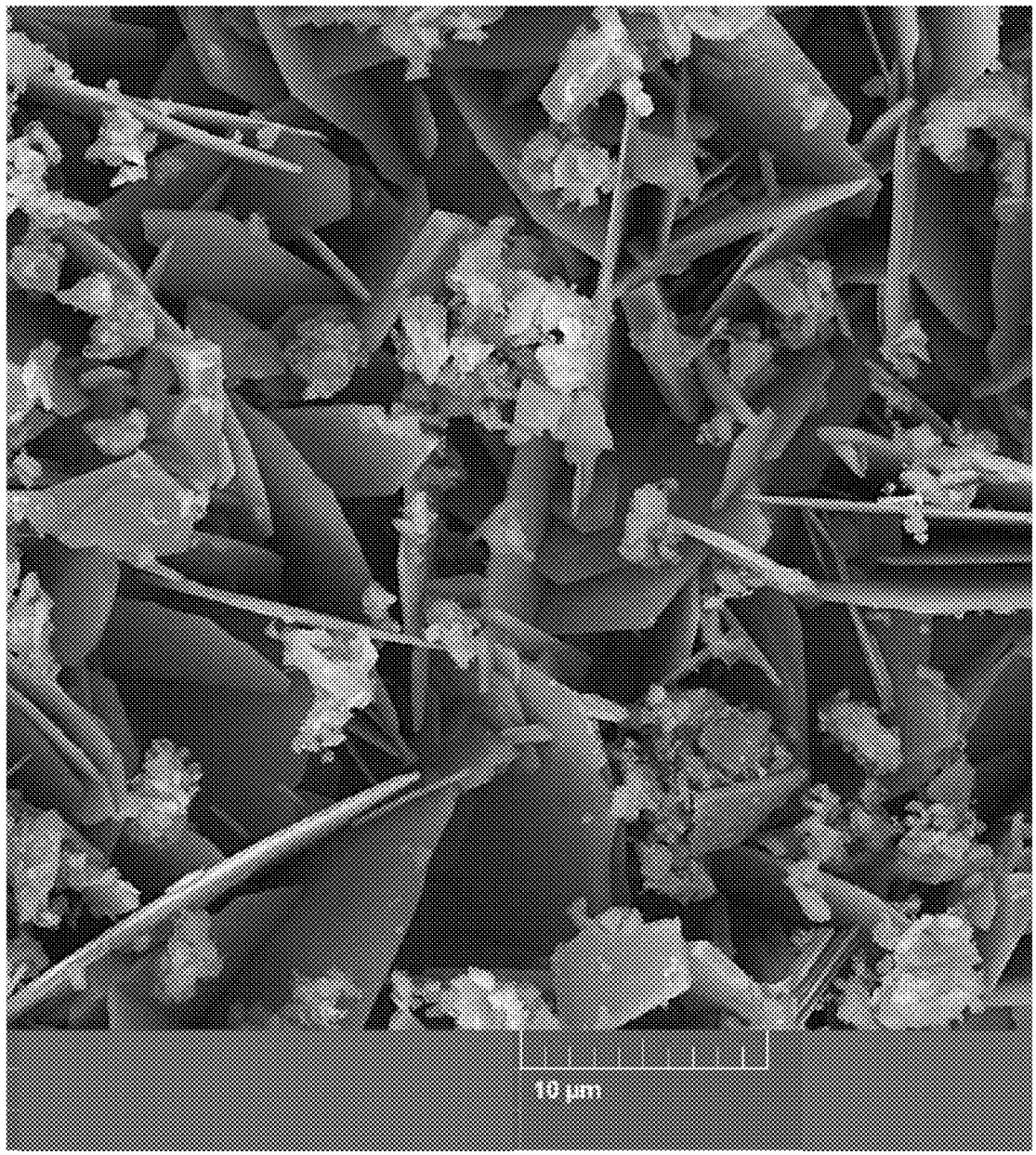
FIG. 3A is a field emission scanning electron microscope (FE-SEM) image of the synthesized $Li_{0.22}MnO_2$ at a magnification of 5 kx, according to an implementation of the present disclosure.
Figure 3B:
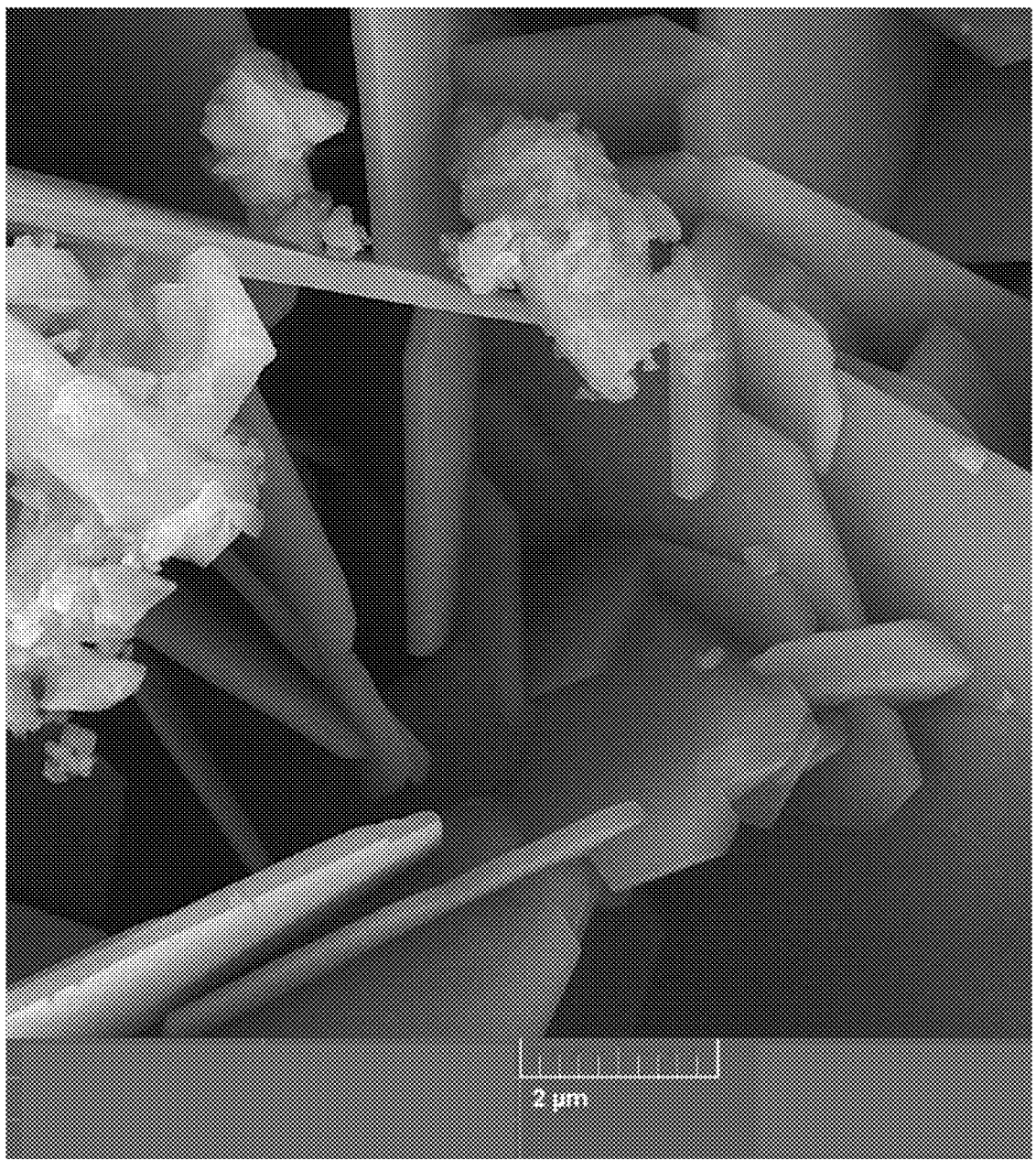
FIG. 3B is an FE-SEM image of the synthesized $Li_{0.22}MnO_2$ at a magnification of 20 kx, according to an implementation of the present disclosure.
Figure 3C:
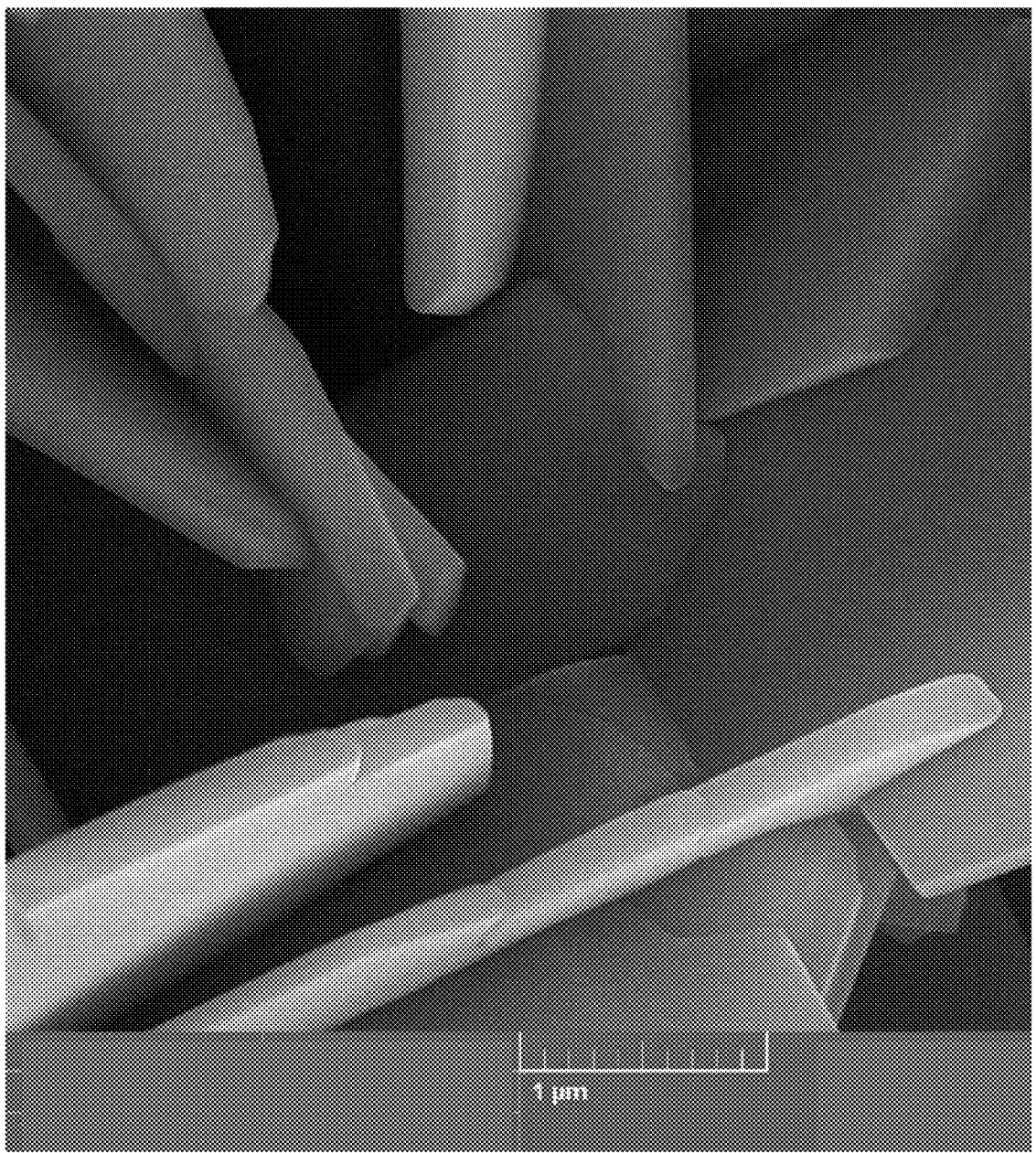
FIG. 3C is an FE-SEM image of the synthesized $Li_{0.22}MnO_2$ at a magnification of 50 kx, according to an implementation of the present disclosure.
Figure 3D:
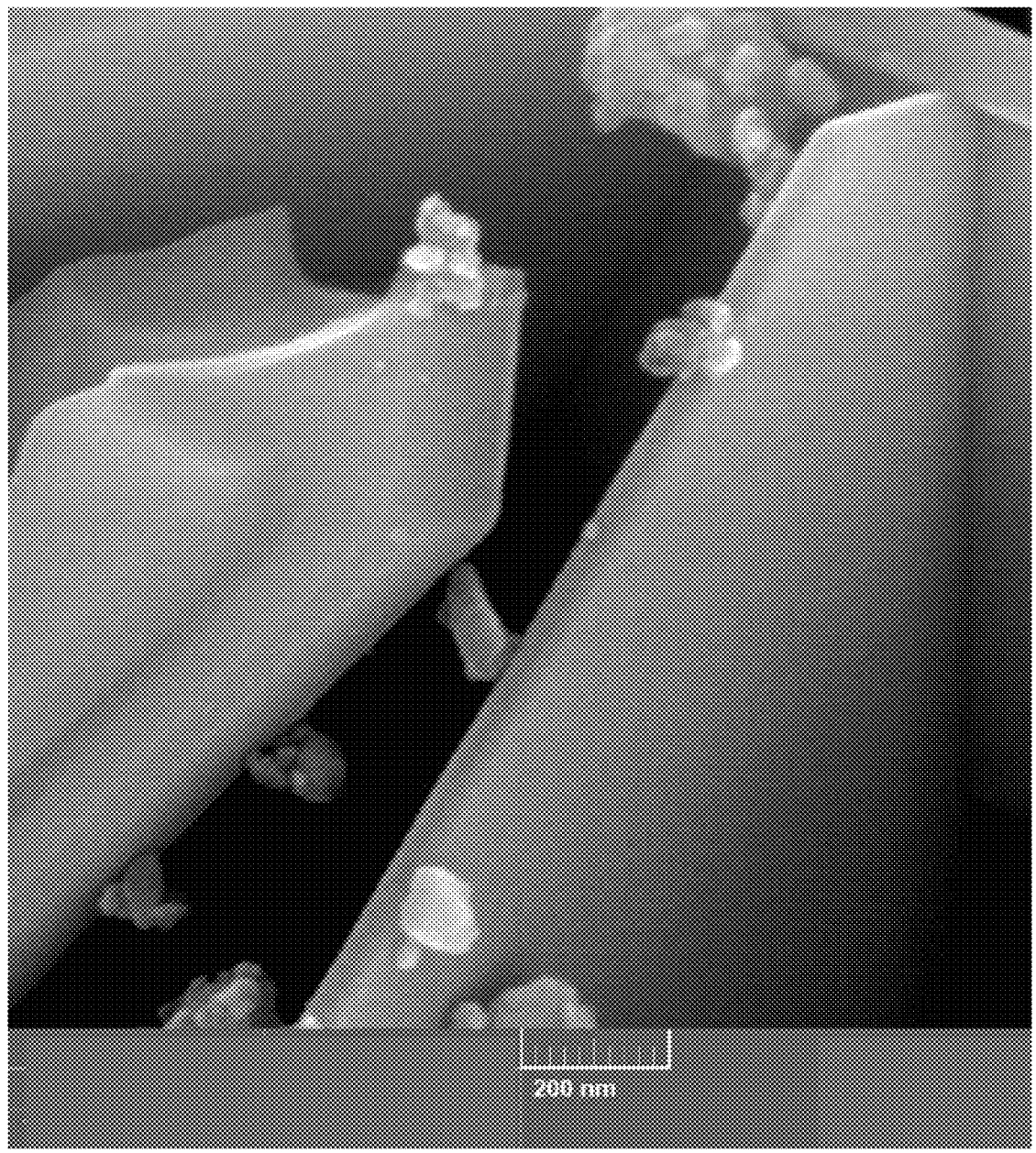
FIG. 3D is an FE-SEM image of the synthesized $Li_{0.22}MnO_2$ at a magnification of 150 kx, according to an implementation of the present disclosure.

FIGS. 3A-3D are field emission scanning electron microscope (FE-SEM) images of the synthesized $Li_{0.22}MnO_2$ at different magnifications. FIG. 3A is an FE-SEM image of the synthesized $Li_{0.22}MnO_2$ at a magnification of 5 kx. FIG. 3B is an FE-SEM image of the synthesized $Li_{0.22}MnO_2$ at a magnification of 20 kx. FIG. 3C is an FE-SEM image of the synthesized $Li_{0.22}MnO_2$ at a magnification of 50 kx. FIG. 3D is an FE-SEM image of the synthesized $Li_{0.22}MnO_2$ at a magnification of 150 kx. Referring to FIGS. 3A-3D, the morphology of the synthesized $Li_{0.22}MnO_2$ contains connected sheets with an average size of a few nanometers to a few micrometers.

Figure 4A:
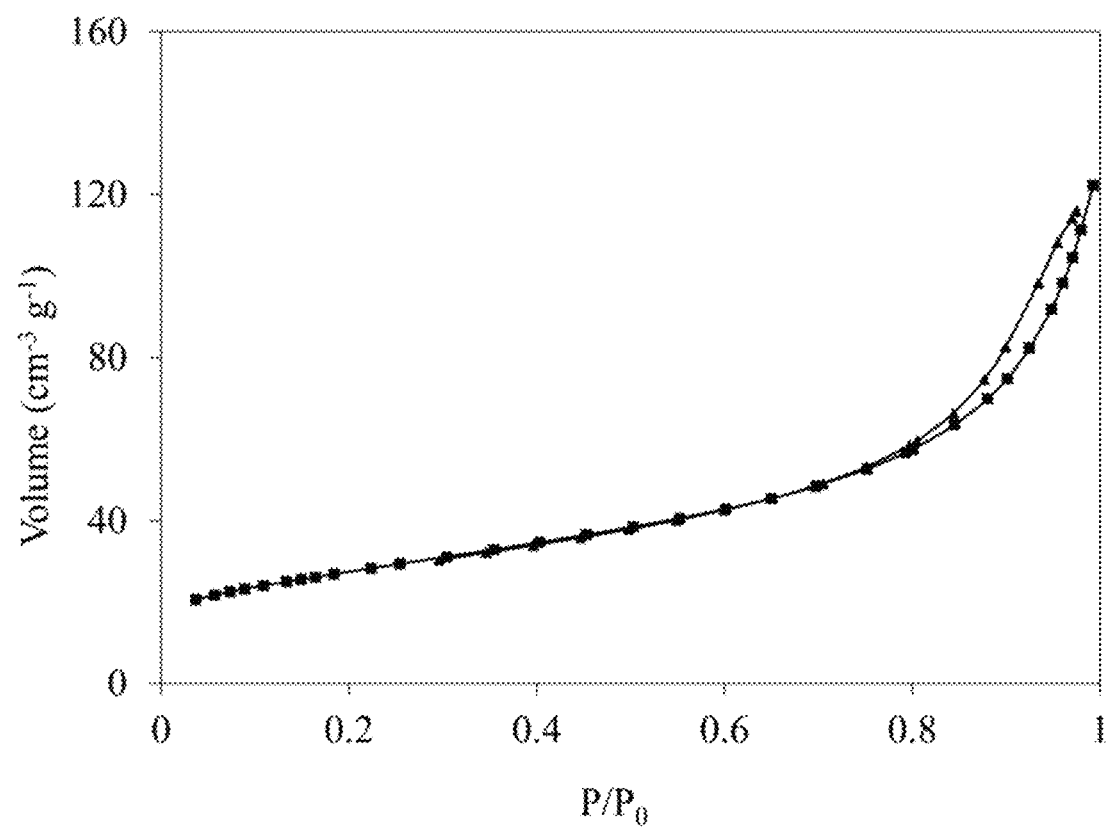
FIG. 4A illustrates an $N_2$ adsorption-desorption isotherm of the synthesized $Li_{0.22}MnO_2$, according to an implementation of the present disclosure.
Figure 4B:
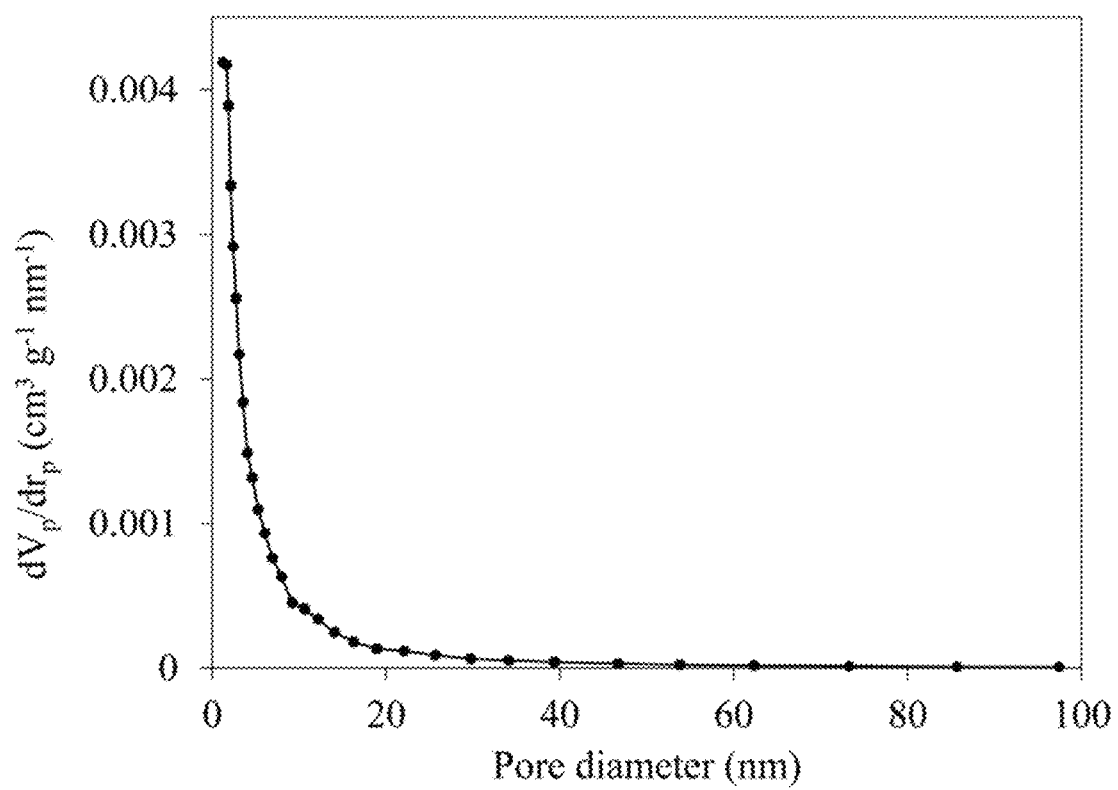
FIG. 4B illustrates a pore size distribution that is calculated from the nitrogen sorption isotherm of the synthesized $Li_{0.22}MnO_2$.

FIG. 4A illustrates an $N_2$ adsorption-desorption isotherm of the synthesized $Li_{0.22}MnO_2$. Referring to FIG. 4A, a typical type IV classification with an H3 hysteresis loop can be observed, which is an obvious characteristic of the mesoporous structure and confirms the mesoporous structure of the synthesized $Li_{0.22}MnO_2$. FIG. 4B illustrates a pore size distribution calculated from the nitrogen sorption isotherm of the synthesized $Li_{0.22}MnO_2$, which shows a narrow pore size distribution centered at 5.16 nm.

Example 2

Synthesizing $Li_{0.36}MnO_2$

In this example, $Li_{0.36}MnO_2$ is synthesized by first preparing an aqueous solution containing $Li_2SO_4$ as a lithium ion source and $MnSO_4$ as a manganese ion source with a $Li^+:Mn^{2+}$ ratio of 10:1. This ratio is kept constant throughout the anodic electrodeposition process. The pH of the prepared aqueous solution was fixed at 6 by adding appropriate amounts of a sulfuric acid solution. The prepared aqueous solution was transferred to an electrodeposition bath. The electrodeposition bath included a 316-stainless steel anode electrode surrounded by two lead cathode sheets. Here, 1.00 $dm^2$ of the anode sheet was exposed to the electrolyte. The temperature of the aqueous solution was fixed at 80° C. using a thermostatic control throughout the electrodeposition. The electrolyte solution was magnetically stirred with a speed of 100 rpm throughout the electrodeposition process. The anodic electrodeposition of lithium manganese dioxide was conducted by passing a pulse reverse current through the electrodeposition cell for 120 minutes with an adjusted anodic duty cycle of 64.29%, a frequency of 14.29 Hz, similar $I_a$ and $I_c$ of 1.00 $mAdm^{-2}$, and a $t_r$ of 20 ms. Afterwards, the deposited lithium manganese dioxide was mechanically removed from the surface of the 316-stainless steel anode and rinsed with distilled water to remove the residues of the acidic electrolyte. Finally, the obtained powder of lithium manganese dioxide was put into a crucible and heated at 110° C. for 3 hours followed by a calcination at 375° C. with a ramping rate of 1° C./min for 3 hours.

Figure 5A:
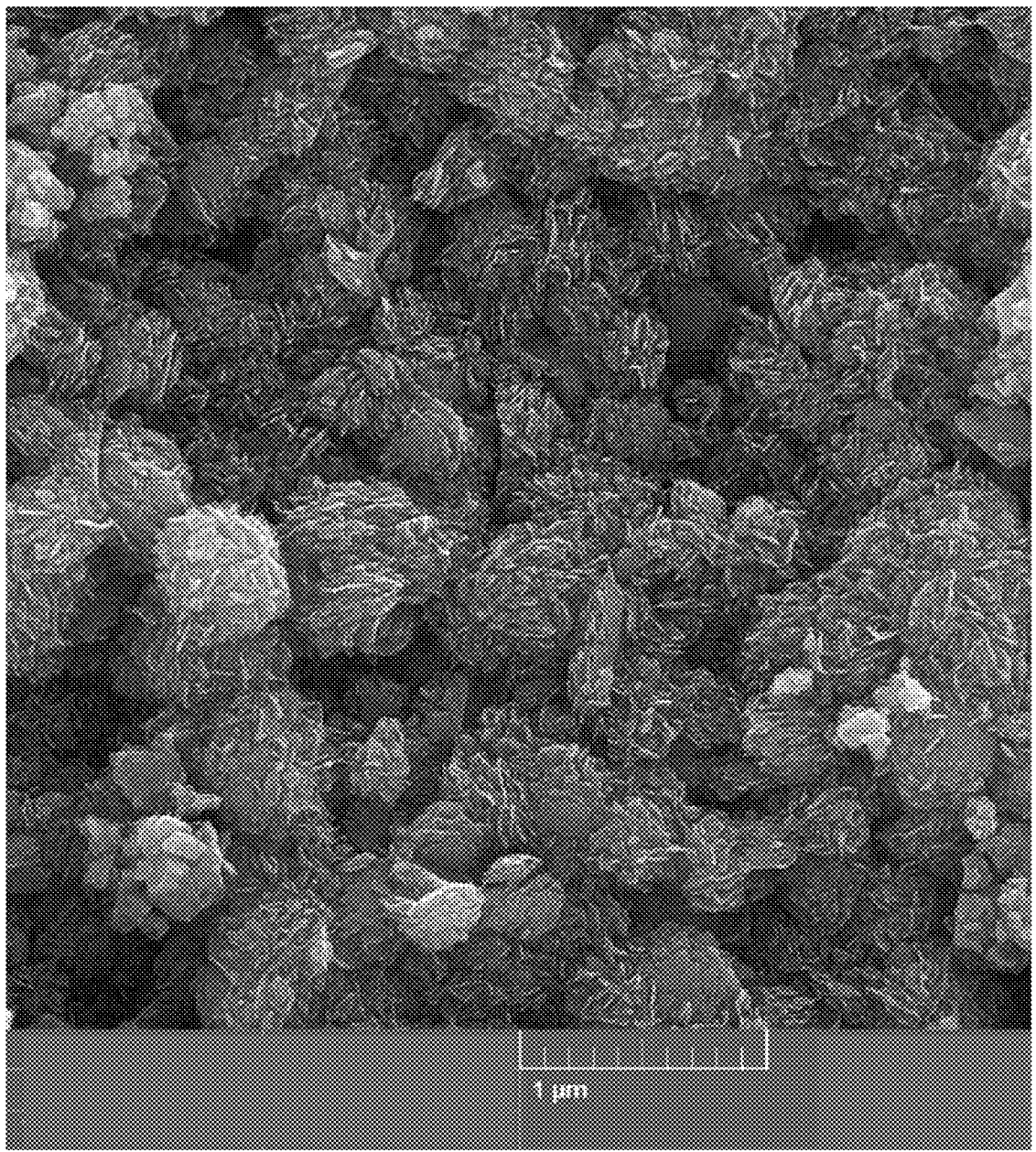
FIG. 5A is an FE-SEM image of the synthesized $Li_{0.36}MnO_2$ at a magnification of 50 kx, according to an implementation of the present disclosure.
Figure 5B:
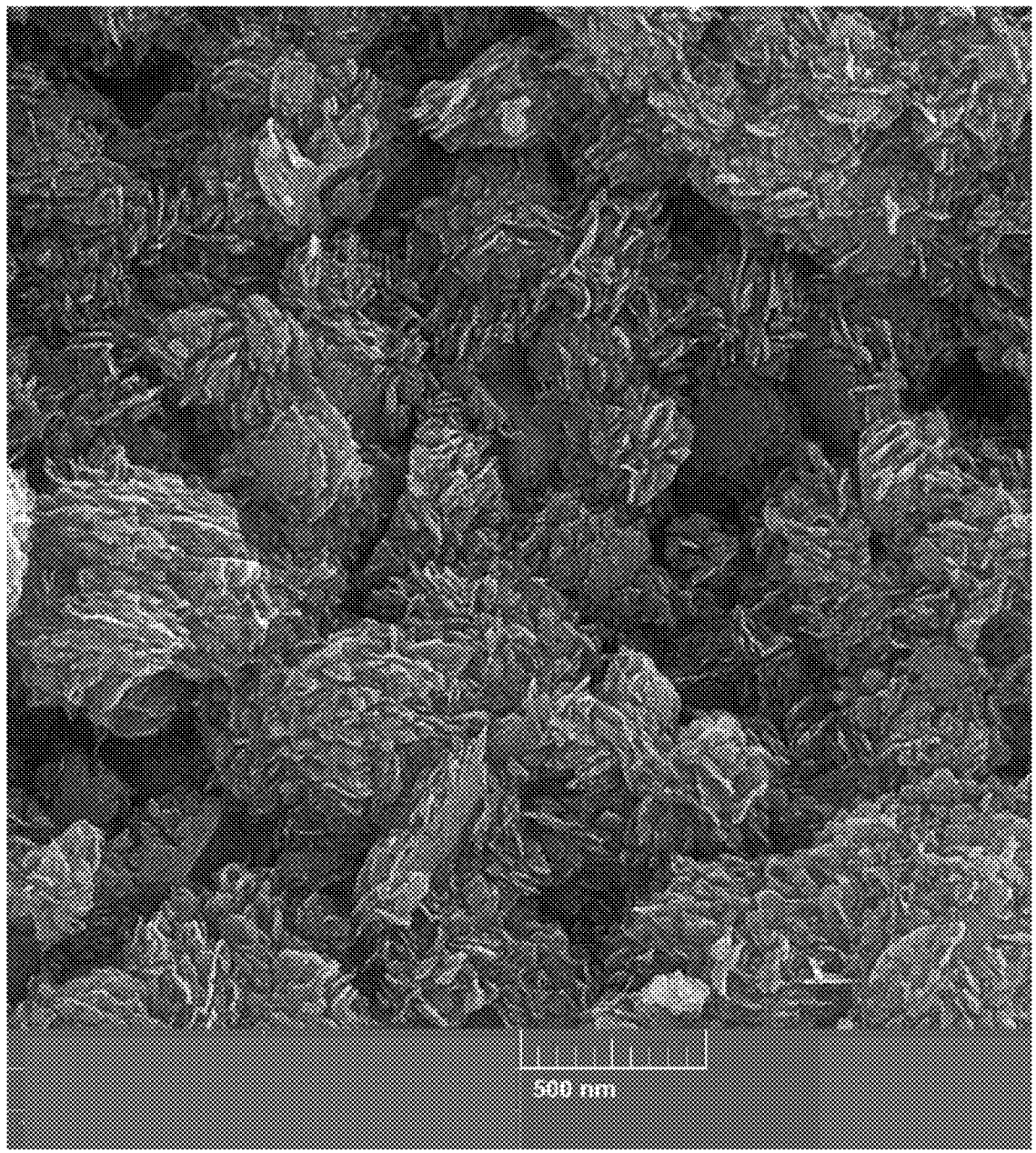
FIG. 5B is an FE-SEM image of the synthesized $Li_{0.36}MnO_2$ at a magnification of 75 kx, according to an implementation of the present disclosure.
Figure 5C:
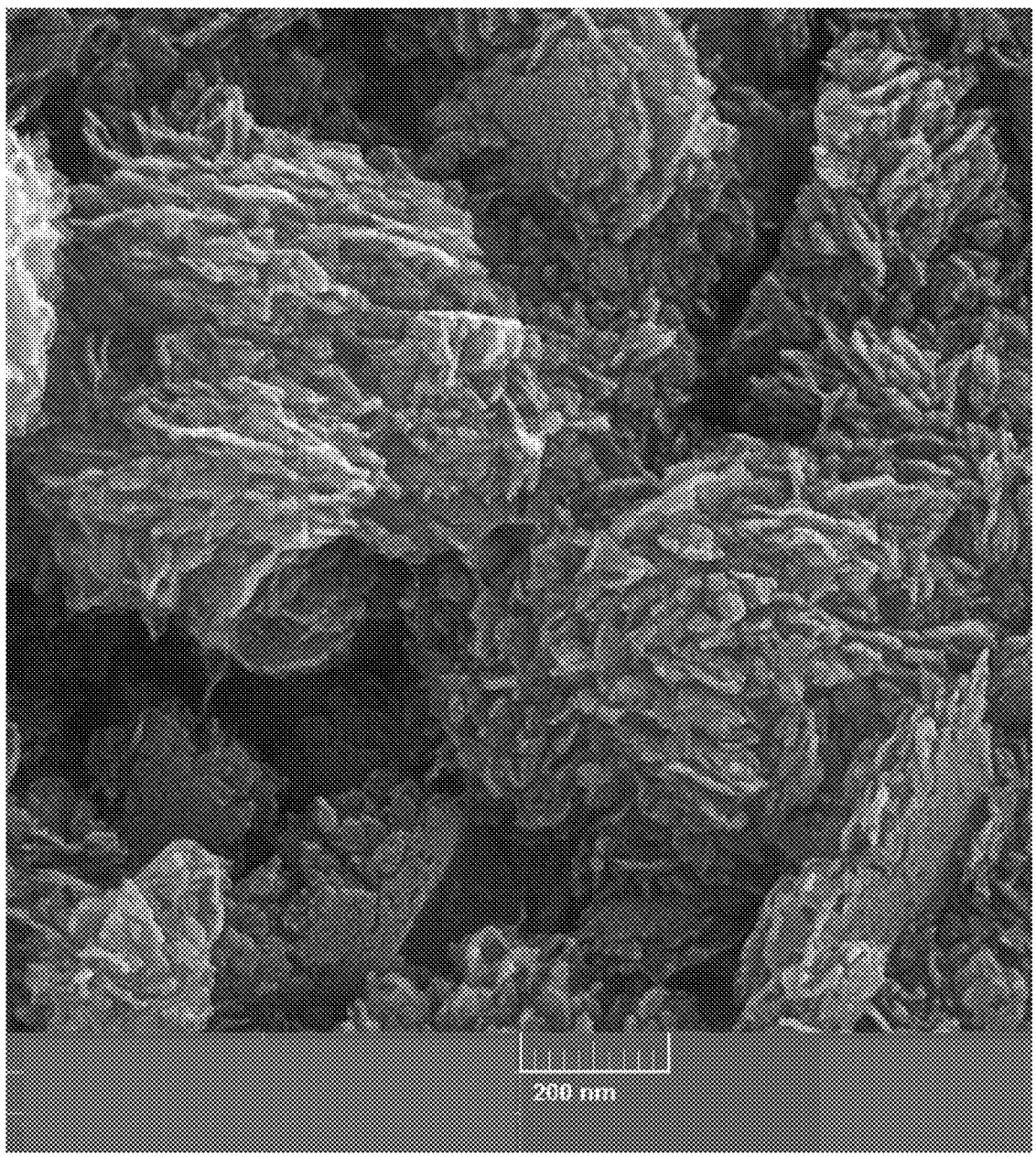
FIG. 5C is an FE-SEM image of the synthesized $Li_{0.36}MnO_2$ at a magnification of 150 kx, according to an implementation of the present disclosure.

FIGS. 5A-5C are field emission scanning electron microscope (FE-SEM) images of the synthesized $Li_{0.36}MnO_2$ at different magnifications. FIG. 5A is an FE-SEM image of the synthesized $Li_{0.36}MnO_2$ at a magnification of 50 kx. FIG. 5B is an FE-SEM image of the synthesized $Li_{0.36}MnO_2$ at a magnification of 75 kx. FIG. 5C is an FE-SEM image of the synthesized $Li_{0.36}MnO_2$ at a magnification of 150 kx. Referring to FIGS. 5A-5C, the morphology of the synthesized $Li_{0.36}MnO_2$ contains sphere-like particles with the overall surface covered with nano-sized papilla.

Figure 6A:
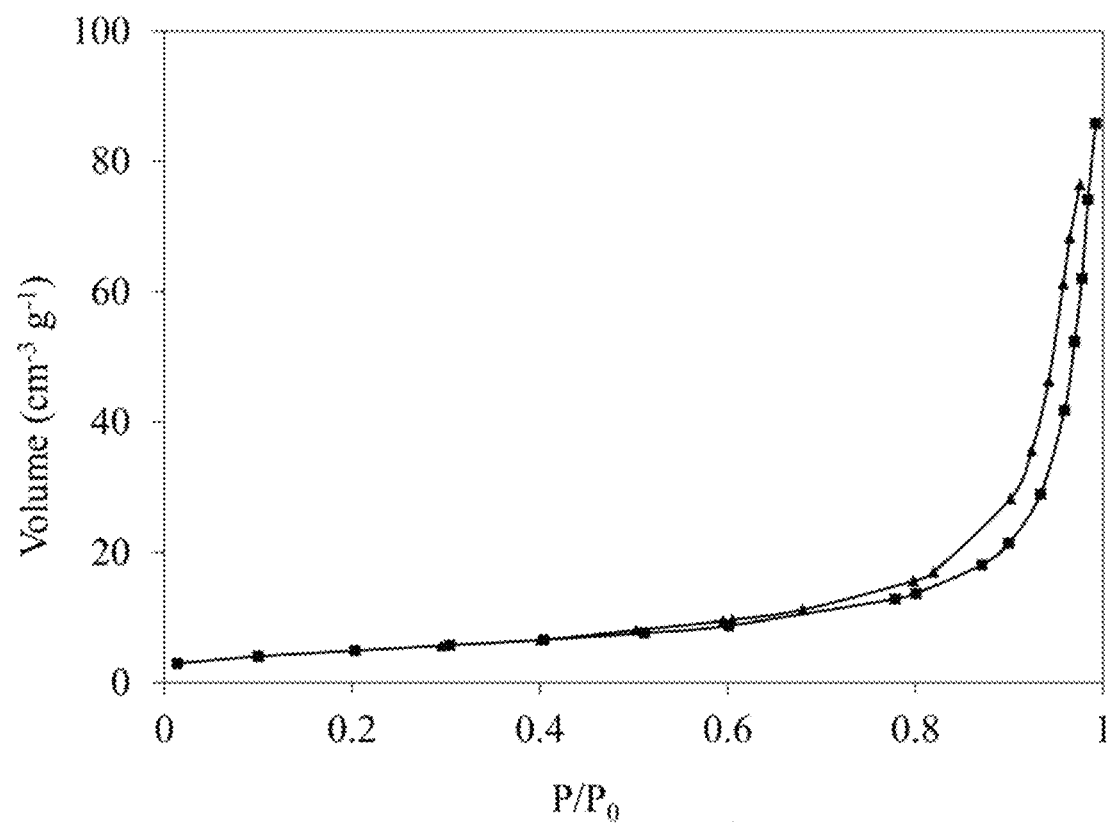
FIG. 6A illustrates an $N_2$ adsorption-desorption isotherm of the synthesized $Li_{0.36}MnO_2$, according to an implementation of the present disclosure.
Figure 6B:
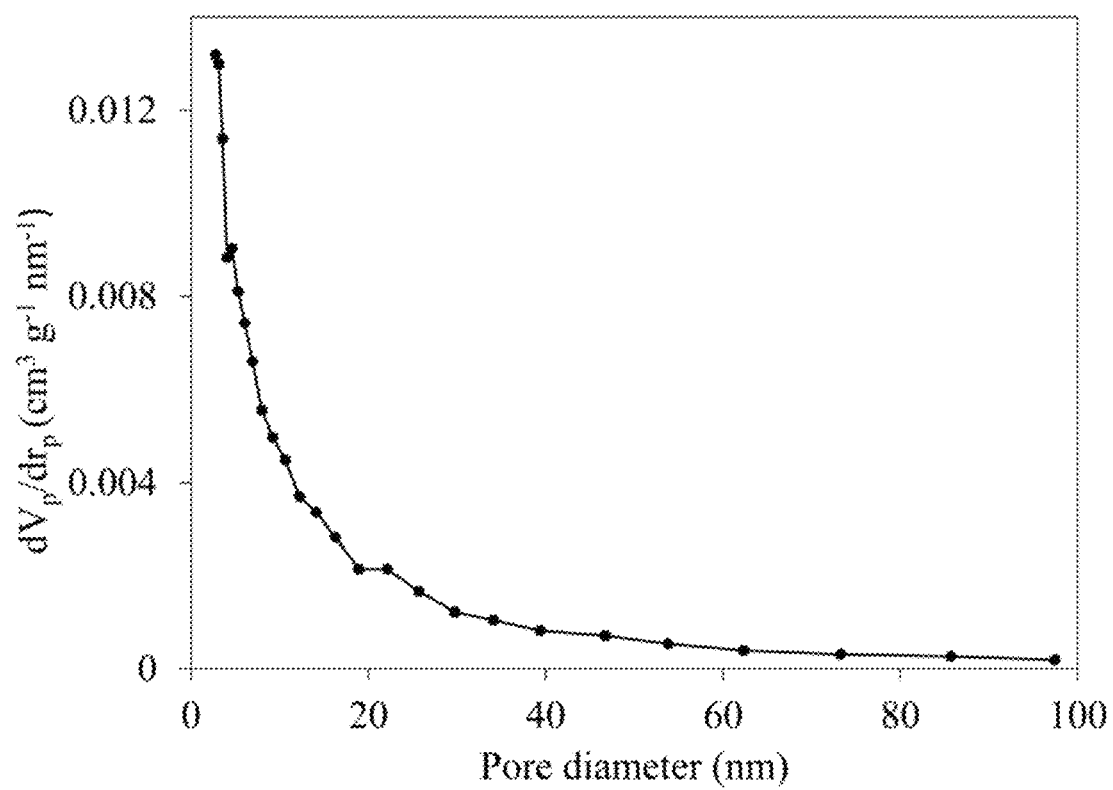
FIG. 6B illustrates a pore size distribution that is calculated from the nitrogen sorption isotherm of the synthesized $Li_{0.36}MnO_2$, according to an implementation of the present disclosure.

FIG. 6A illustrates an $N_2$ adsorption-desorption isotherm of the synthesized $Li_{0.36}MnO_2$. Referring to FIG. 6A, a typical type IV classification with an H3 hysteresis loop can be observed, which is an obvious characteristic of the mesoporous structure and confirms the mesoporous structure of the synthesized $Li_{0.36}MnO_2$. FIG. 6B illustrates a correspondent pore size distribution calculated from the nitrogen sorption isotherm of the synthesized $Li_{0.36}MnO_2$, which shows a narrow pore size distribution centered at 5.40 nm.

Example 3

Synthesizing $Li_{0.65}MnO_2$

In this example, $Li_{0.65}MnO_2$ is synthesized by first preparing an aqueous solution containing $Li_2SO_4$ as a lithium ion source and $MnSO_4$ as a manganese ion source with a $Li^+:Mn^{2+}$ ratio of 10:1. This ratio is kept constant throughout the anodic electrodeposition process. The pH of the prepared aqueous solution was fixed at 6 by adding appropriate amounts of a sulfuric acid solution. The prepared aqueous solution was transferred to an electrodeposition bath. The electrodeposition bath included a 316-stainless steel anode electrode surrounded by two lead cathode sheets. Here, 1.00 $dm^2$ of the anode sheet was exposed to the electrolyte. The temperature of the aqueous solution was fixed at 80° C. using a thermostatic control throughout the electrodeposition. The electrolyte solution was magnetically stirred with a speed of 100 rpm throughout the electrodeposition process. The anodic electrodeposition of lithium manganese dioxide was conducted by passing a pulse reverse current through the electrodeposition cell for 120 minutes with an adjusted anodic duty cycle of 79.17%, a frequency of 8.33 Hz, similar $I_a$ and $I_c$ of 1.00 $mAdm^{-2}$, and a $t_r$ of 20 ms. Afterwards, the deposited lithium manganese dioxide was mechanically removed from the surface of the 316-stainless steel anode and rinsed with distilled water to remove the residuals of the acidic electrolyte. Finally, the obtained powder of lithium manganese dioxide was put into a crucible and heated at 110° C. for 3 hours followed by a calcination at 375° C. with a ramping rate of 1° C./min for 3 hours.

Figure 7A:
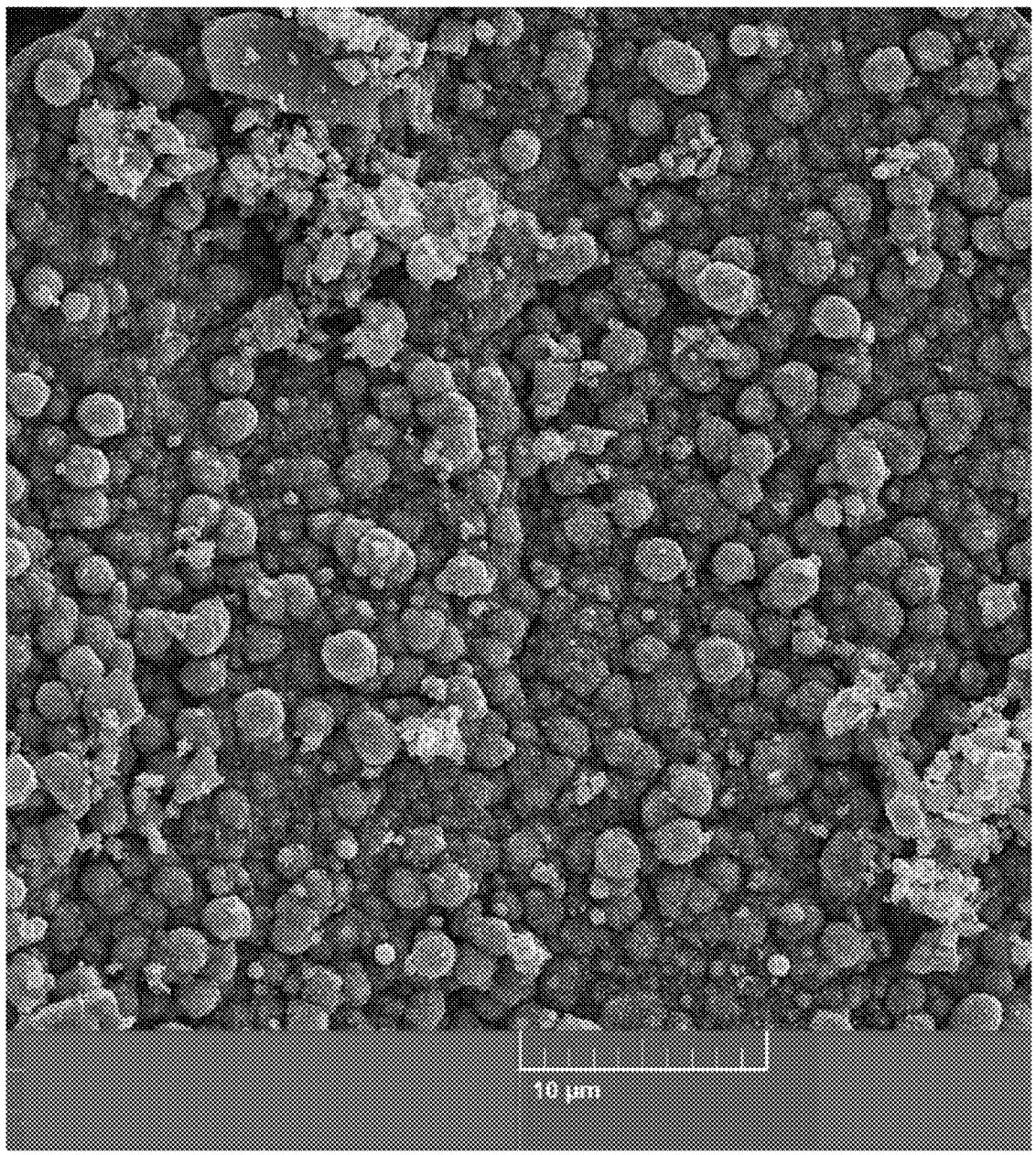
FIG. 7A is an FE-SEM image of the synthesized $Li_{0.65}MnO_2$ at a magnification of 5 kx, according to an implementation of the present disclosure.
Figure 7B:
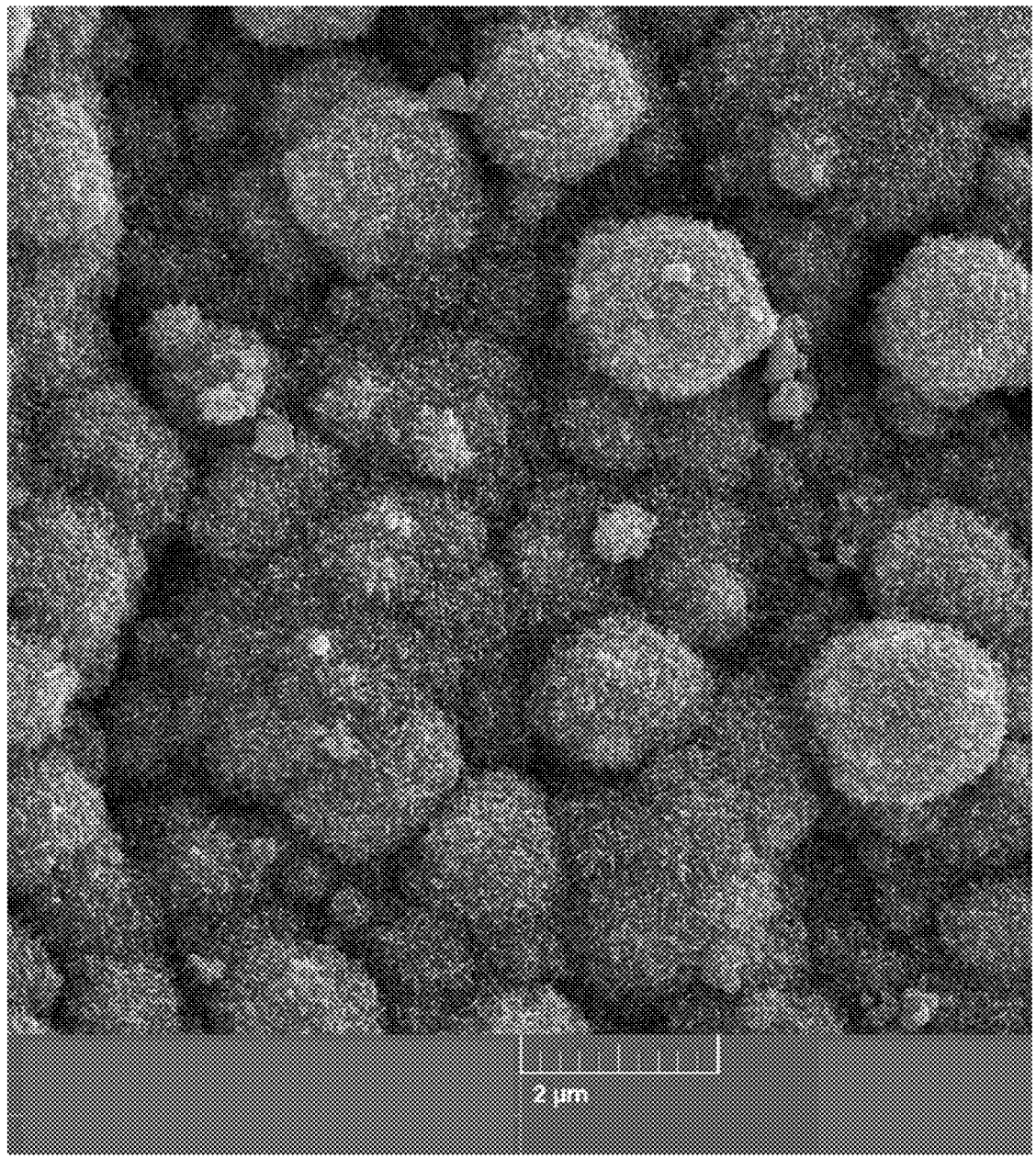
FIG. 7B is an FE-SEM image of the synthesized $Li_{0.65}MnO_2$ at a magnification of 20 kx, according to an implementation of the present disclosure.
Figure 7C:
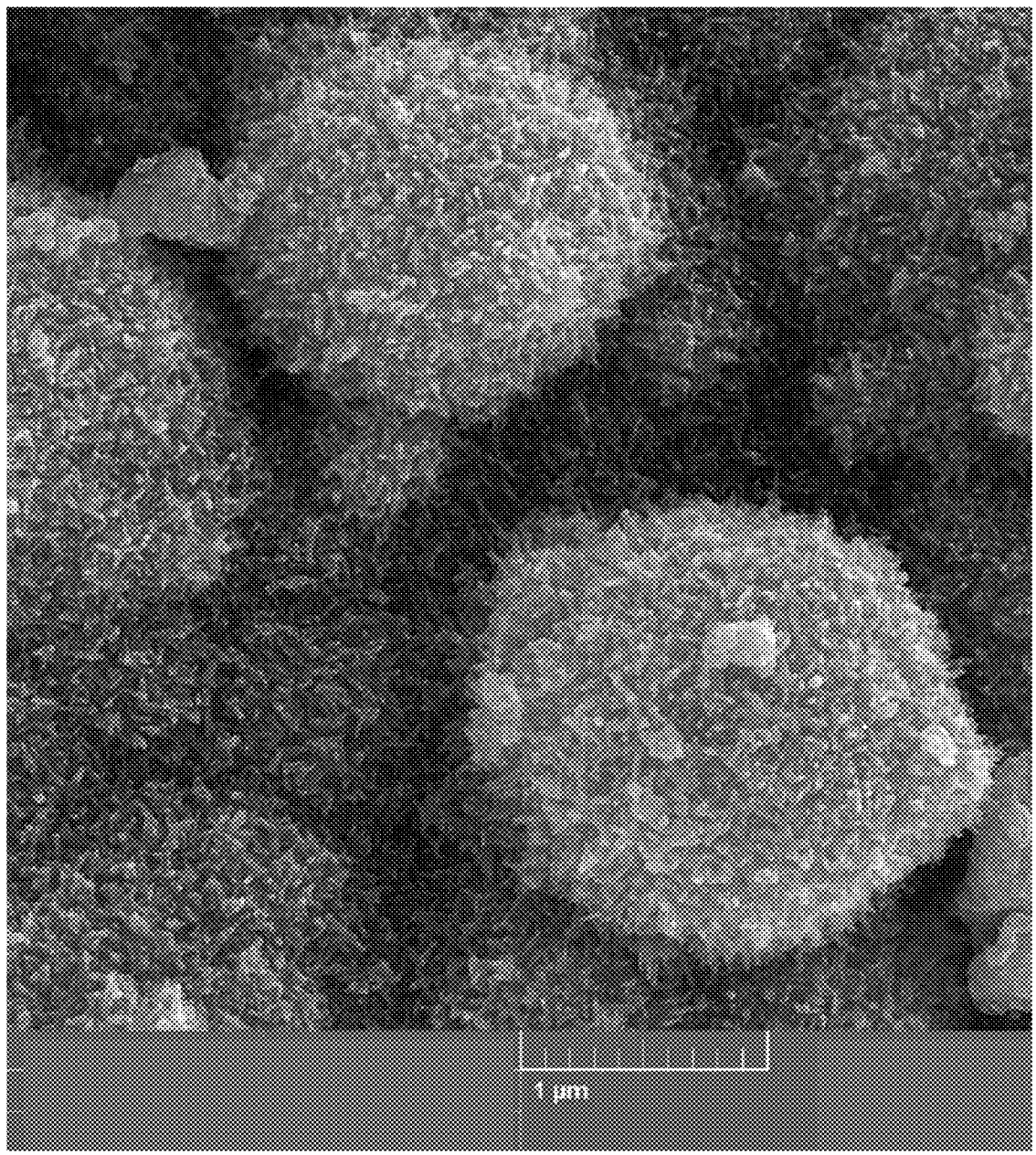
FIG. 7C is an FE-SEM image of the synthesized $Li_{0.65}MnO_2$ at a magnification of 50 kx, according to an implementation of the present disclosure.
Figure 7D:
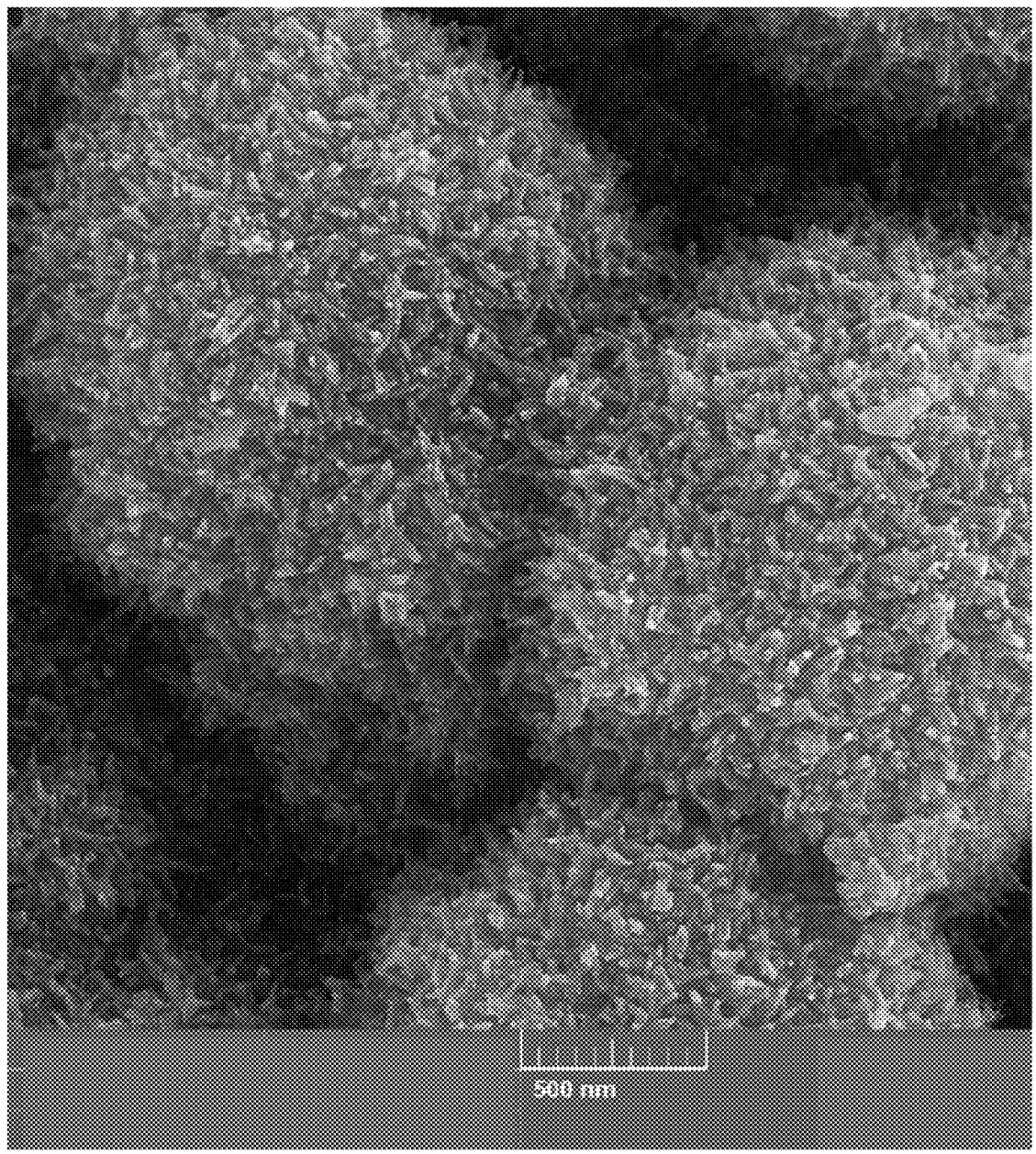
FIG. 7D illustrates an FE-SEM image of the synthesized $Li_{0.65}MnO_2$ at a magnification of 75 kx, according to an implementation of the present disclosure.
Figure 7E:
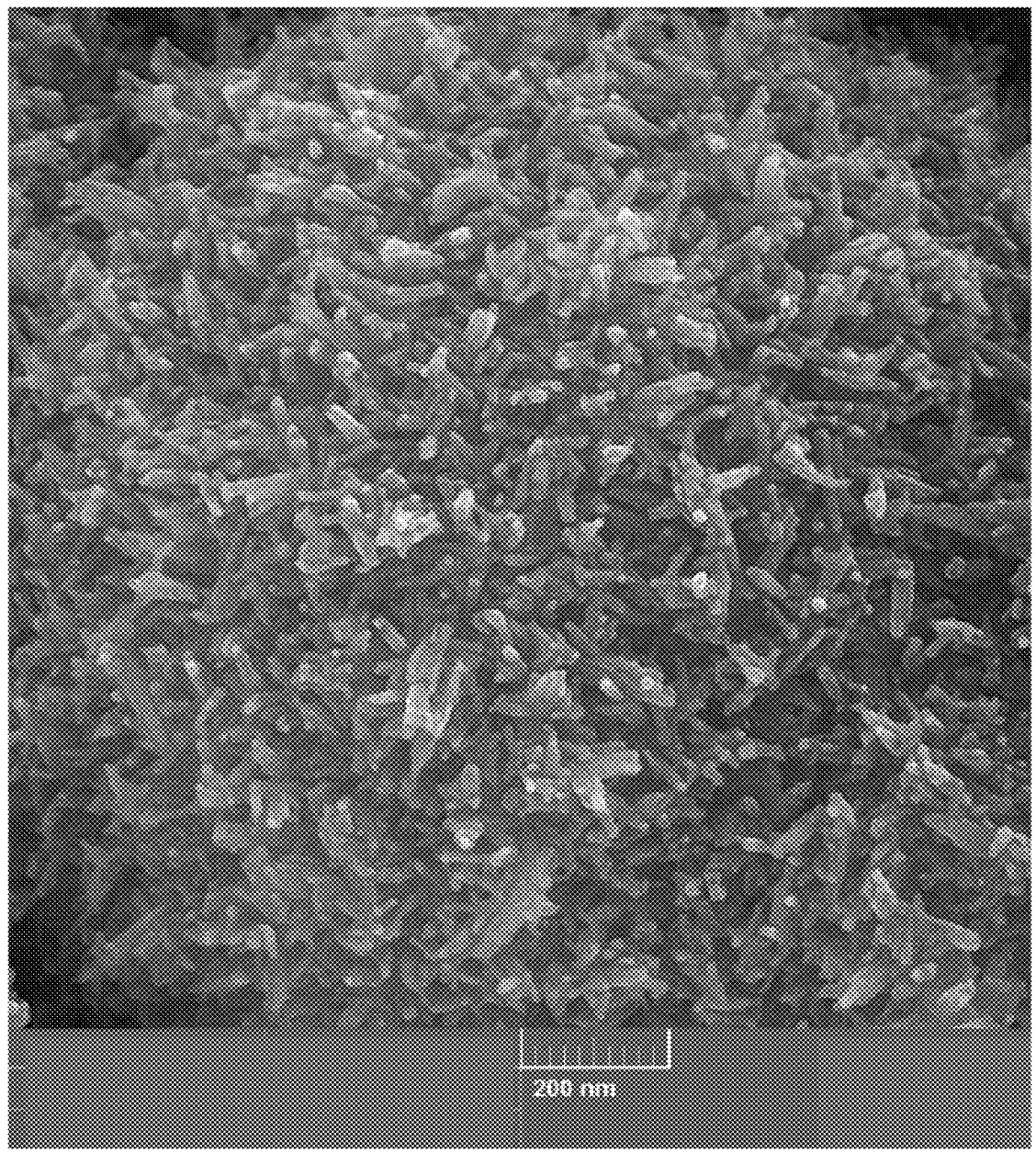
FIG. 7E illustrates an FE-SEM image of the synthesized $Li_{0.65}MnO_2$ at a magnification of 150 kx, according to an implementation of the present disclosure.

FIGS. 7A-7E are field emission scanning electron microscope (FE-SEM) images of the synthesized $Li_{0.65}MnO_2$ at different magnifications. FIG. 7A is an FE-SEM image of the synthesized $Li_{0.65}MnO_2$ at a magnification of 5 kx. FIG. 7B is an FE-SEM image of the synthesized $Li_{0.65}MnO_2$ at a magnification of 20 kx. FIG. 7C is an FE-SEM image of the synthesized $Li_{0.65}MnO_2$ at a magnification of 50 kx. FIG. 7D is an FE-SEM image of the synthesized $Li_{0.65}MnO_2$ at a magnification of 75 kx. FIG. 7E is an FE-SEM image of the synthesized $Li_{0.65}MnO_2$ at a magnification of 150 kx. Referring to FIGS. 7A-7E, the morphology of the synthesized $Li_{0.65}MnO_2$ contains a so-called hierarchical urchin-like morphology which consists of hierarchical sphere like particles with the overall surface covered with nanorods.

Figure 8A:
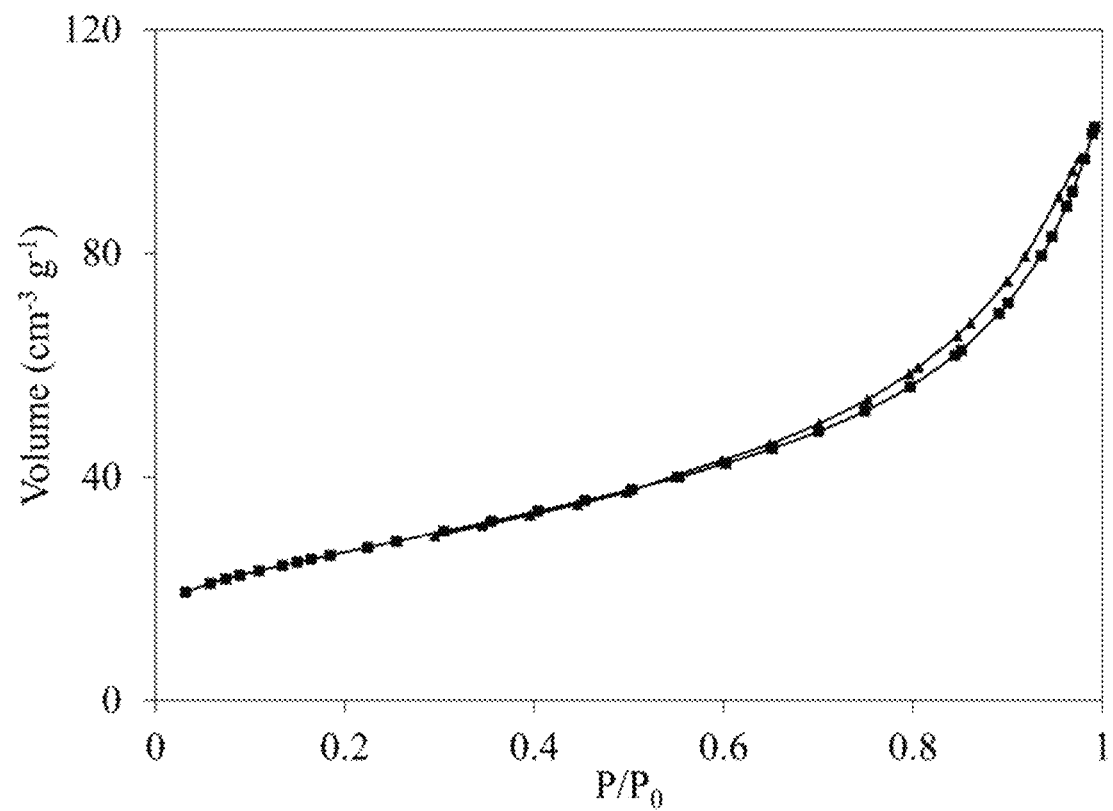
FIG. 8A illustrates an $N_2$ adsorption-desorption isotherm of the synthesized $Li_{0.65}MnO_2$, according to an implementation of the present disclosure.
Figure 8B:
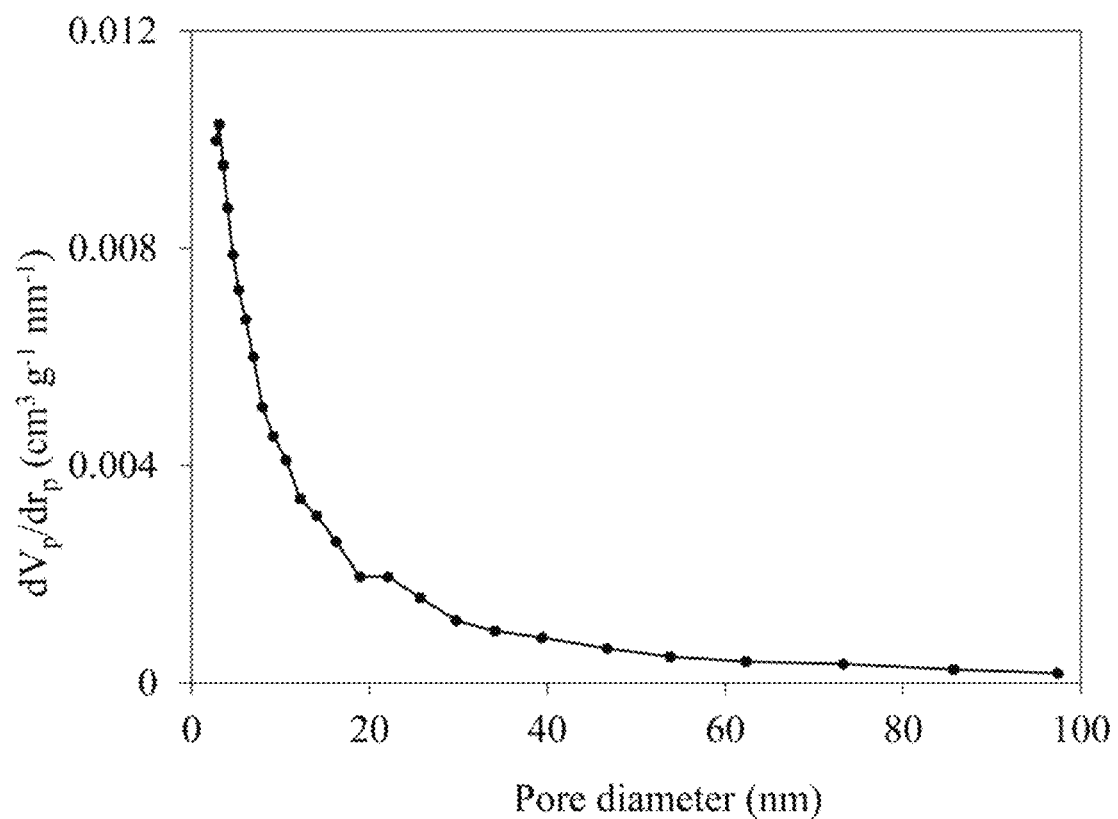
FIG. 8B illustrates a pore size distribution that is calculated from the nitrogen sorption isotherm of the synthesized $Li_{0.65}MnO_2$, according to an implementation of the present disclosure.

FIG. 8A illustrates an $N_2$ adsorption-desorption isotherm of the synthesized $Li_{0.65}MnO_2$. Referring to FIG. 8A, a typical type IV classification with an H3 hysteresis loop can be observed, which is an obvious characteristic of the mesoporous structure and confirms the mesoporous structure of the synthesized $Li_{0.65}MnO_2$. FIG. 8B illustrates a correspondent pore size distribution calculated from the nitrogen sorption isotherm of the synthesized $Li_{0.65}MnO_2$, which shows a narrow pore size distribution centered at 5.64 nm.

Example 4

Synthesizing $Li_{0.34}MnO_2$

In this example, $Li_{0.34}MnO_2$ is synthesized by first preparing an aqueous solution containing $Li_2SO_4$ as a lithium ion source and $MnSO_4$ as a manganese ion source with a $Li^+:Mn^{2+}$ ratio of 10:1. This ratio is kept constant throughout the anodic electrodeposition process. The pH of the prepared aqueous solution was fixed at 6 by adding appropriate amounts of a sulfuric acid solution. The prepared aqueous solution was transferred to an electrodeposition bath. The electrodeposition bath included a 316-stainless steel anode electrode surrounded by two lead cathode sheets. Here, 1.00 $dm^2$ of the anode sheet was exposed to the electrolyte. The temperature of the aqueous solution was fixed at 80° C. using a thermostatic control throughout the electrodeposition. The electrolyte solution was magnetically stirred with a speed of 100 rpm throughout the electrodeposition process. The anodic electrodeposition of lithium manganese dioxide was conducted by passing a pulse reverse current through the electrodeposition cell for 120 minutes with an adjusted anodic duty cycle of 44.44%, a frequency of 22.22 Hz, similar $I_a$ and $I_c$ of 1.00 $mAdm^{-2}$, and a $t_r$ of 20 ms. Afterwards, the deposited lithium manganese dioxide was mechanically removed from the surface of the 316-stainless steel anode and rinsed with distilled water to remove the residuals of the acidic electrolyte. Finally, the obtained powder of lithium manganese dioxide was put into a crucible and heated at 110° C. for 3 hours followed by a calcination at 375° C. with a ramping rate of 1° C./min for 3 hours.

Figure 9A:
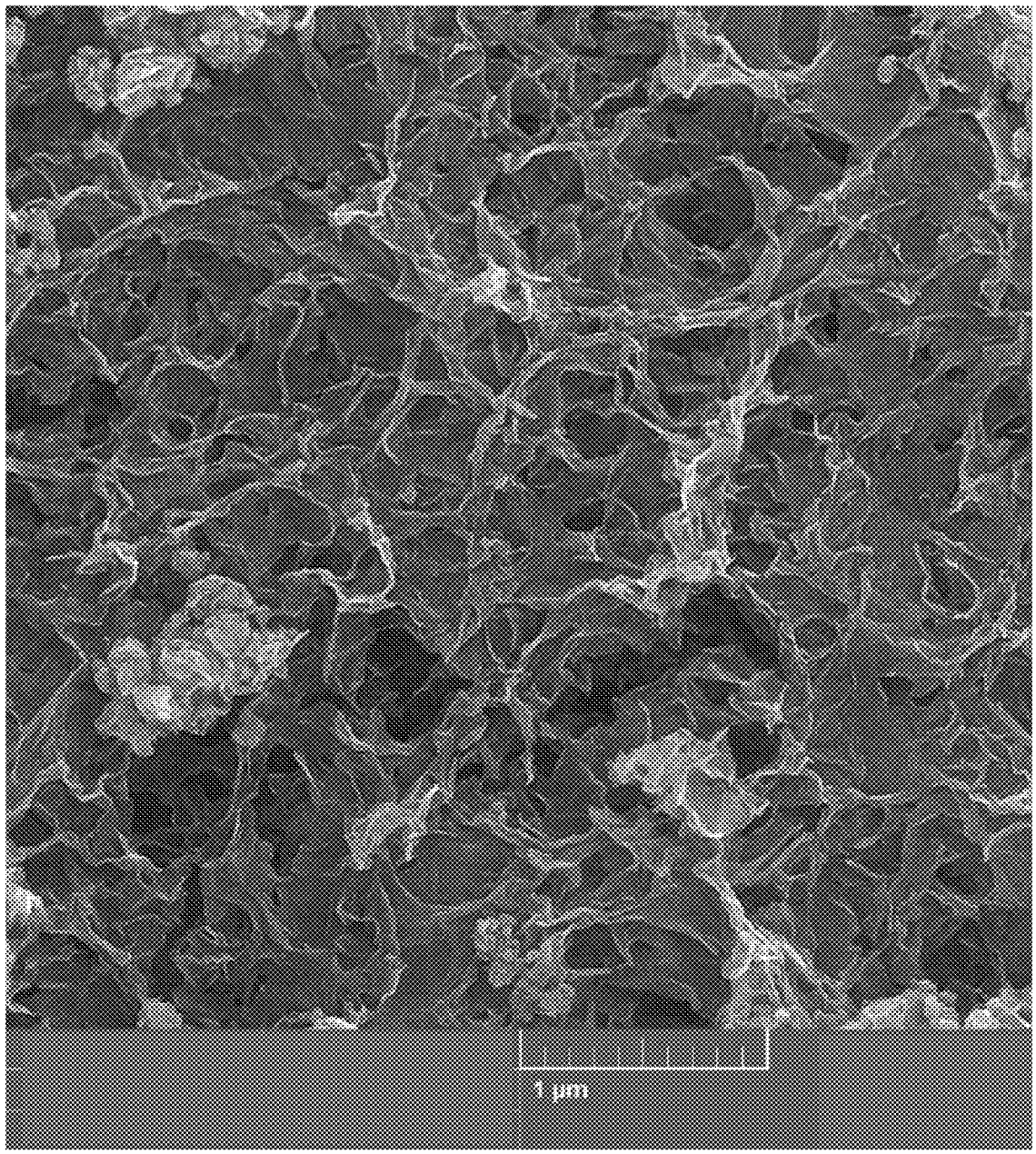
FIG. 9A is an FE-SEM image of the synthesized $Li_{0.34}MnO_2$ at a magnification of 50 kx, according to an implementation of the present disclosure.
Figure 9B:
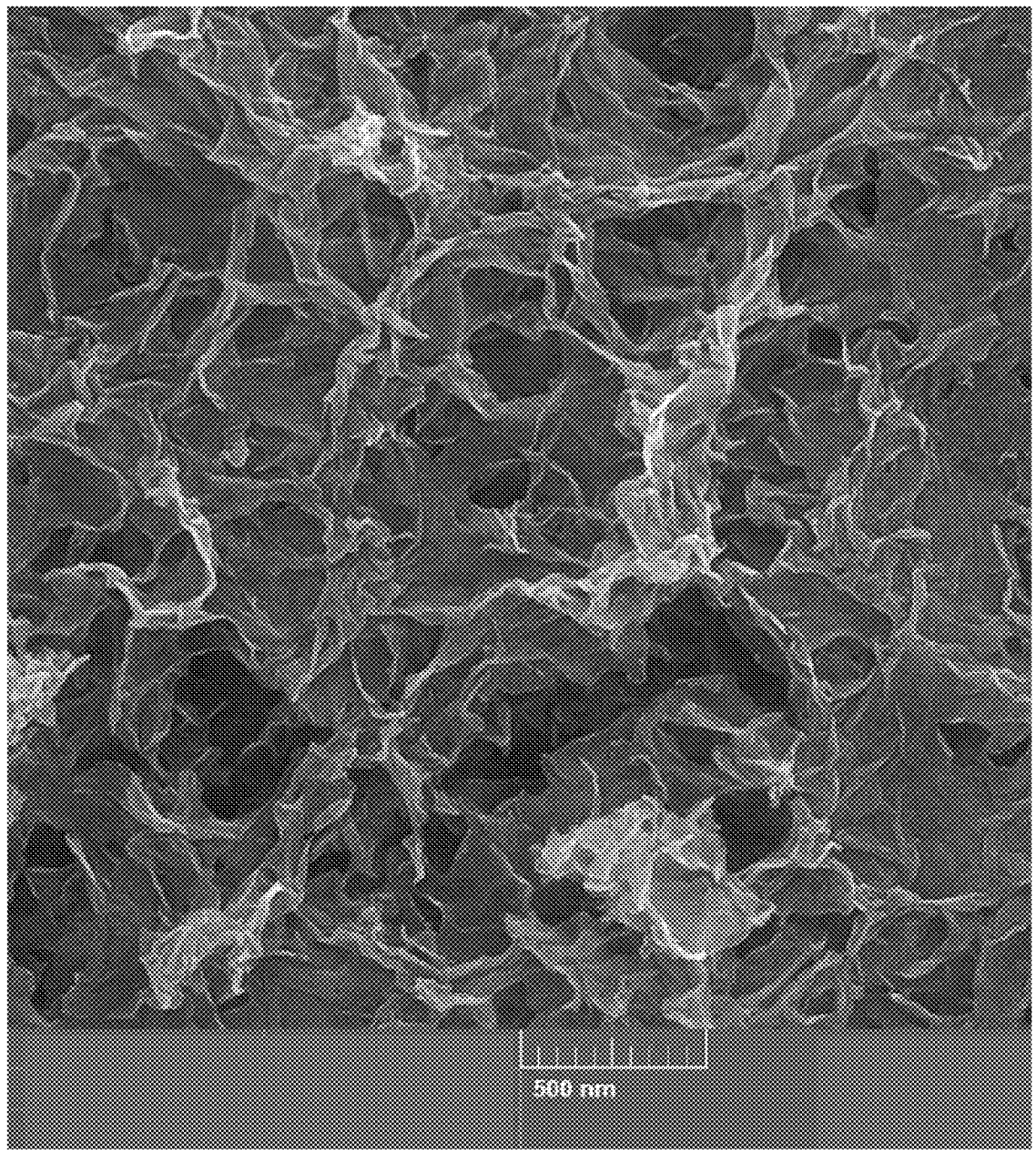
FIG. 9B illustrates an FE-SEM image of the synthesized $Li_{0.34}MnO_2$ at a magnification of 75 kx, according to an implementation of the present disclosure.
Figure 9C:
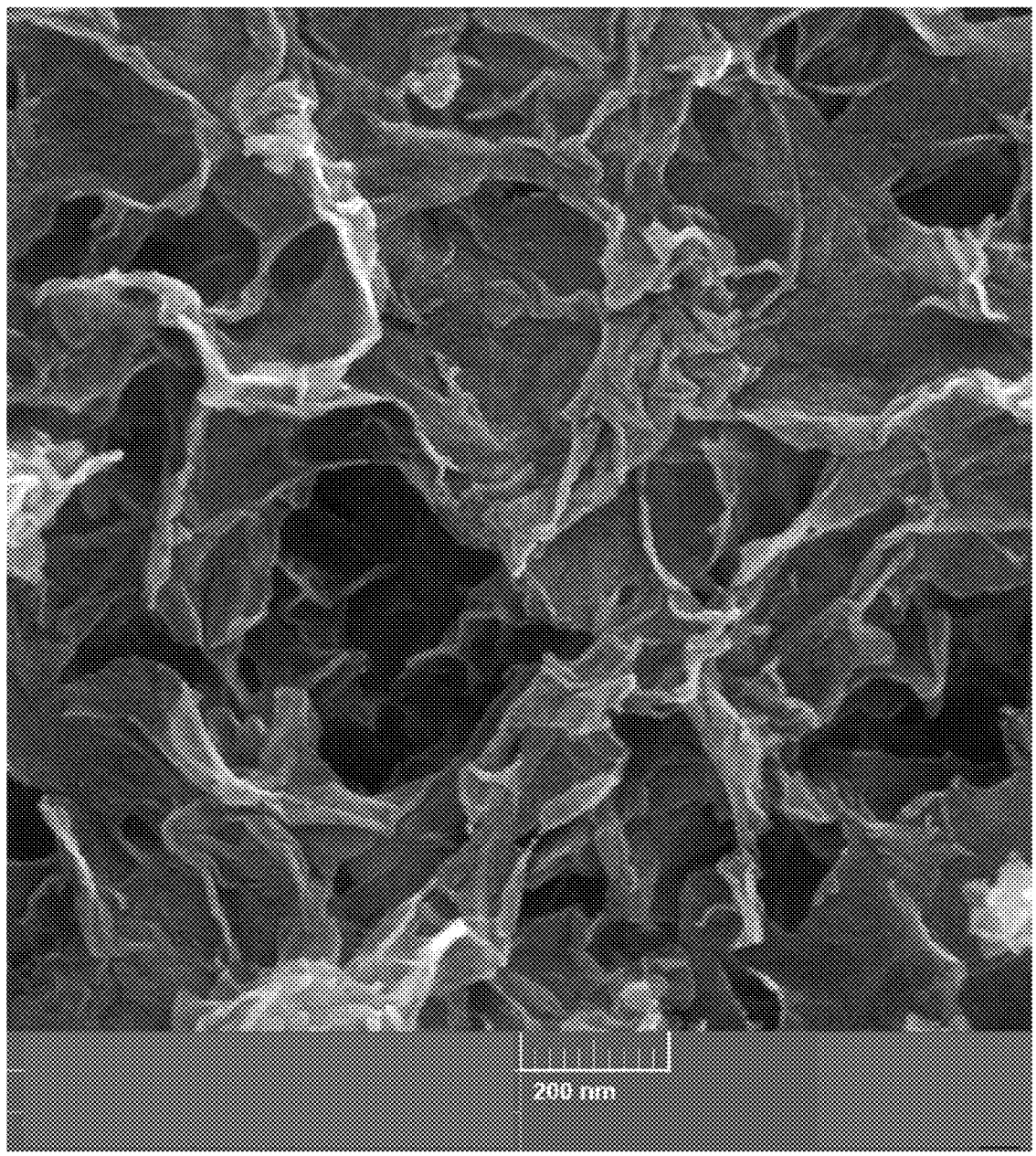
FIG. 9C is an FE-SEM image of the synthesized $Li_{0.34}MnO_2$ at a magnification of 150 kx, according to an implementation of the present disclosure.

FIGS. 9A-9C are field emission scanning electron microscope (FE-SEM) images of the synthesized $Li_{0.34}MnO_2$ at different magnifications. FIG. 9A is an FE-SEM image of the synthesized $Li_{0.34}MnO_2$ at a magnification of 50 kx. FIG. 9B is an FE-SEM image of the synthesized $Li_{0.34}MnO_2$ at a magnification of 75 kx. FIG. 9C is an FE-SEM image of the synthesized $Li_{0.34}MnO_2$ at a magnification of 150 kx. Referring to FIGS. 9A-9C, the morphology of the synthesized $Li_{0.34}MnO_2$ contains interconnected nano-flakes with a thickness less than 10 nanometers.

Figure 10A:
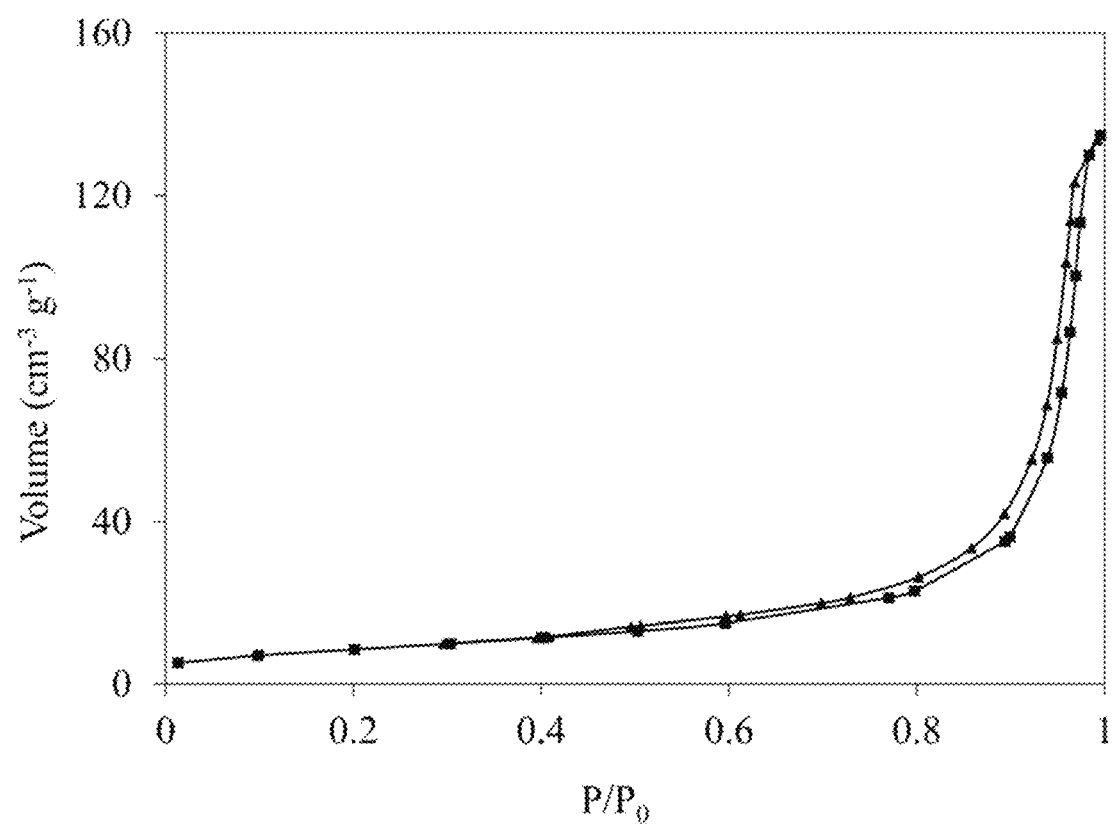
FIG. 10A illustrates an $N_2$ adsorption-desorption isotherm of the synthesized $Li_{0.34}MnO_2$, according to an implementation of the present disclosure.
Figure 10B:
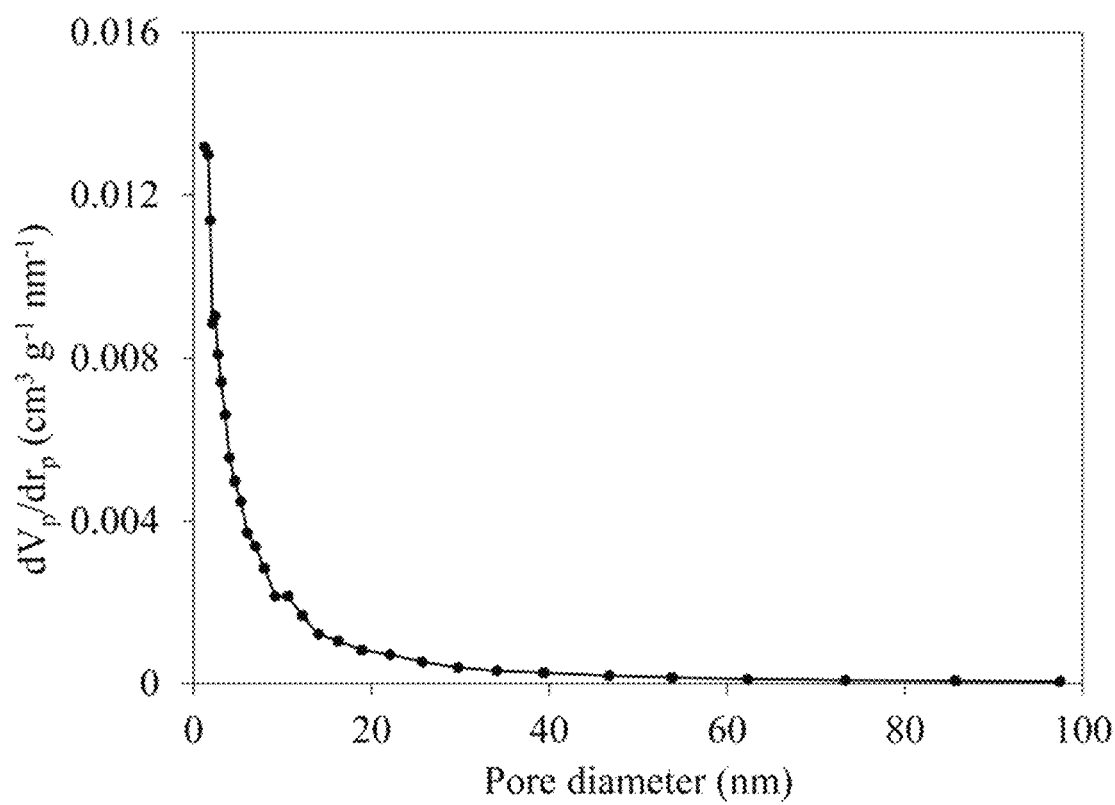
FIG. 10B illustrates a pore size distribution that is calculated from the nitrogen sorption isotherm of the synthesized $Li_{0.34}MnO_2$, according to an implementation of the present disclosure.

FIG. 10A illustrates an $N_2$ adsorption-desorption isotherm of the synthesized $Li_{0.34}MnO_2$. Referring to FIG. 10A, a typical type IV classification with an H3 hysteresis loop can be observed, which is an obvious characteristic of the mesoporous structure and confirms the mesoporous structure of the synthesized $Li_{0.34}MnO_2$. FIG. 10B illustrates a correspondent pore size distribution calculated from the nitrogen sorption isotherm of the synthesized $Li_{0.34}MnO_2$, which shows a narrow pore size distribution centered at 8.70 nm.

Example 5

Synthesizing $Li_{0.52}MnO_2$

In this example, $Li_{0.52}MnO_2$ is synthesized by first preparing an aqueous solution containing $Li_2SO_4$ as a lithium ion source and $MnSO_4$ as a manganese ion source with a $Li^+:Mn^{2+}$ ratio of 10:1. This ratio is kept constant throughout the anodic electrodeposition process. The pH of the prepared aqueous solution was fixed at 6 by adding appropriate amounts of a sulfuric acid solution. The prepared aqueous solution was transferred to an electrodeposition bath. The electrodeposition bath included a 316-stainless steel anode electrode surrounded by two lead cathode sheets. Here, 1.00 $dm^2$ of the anode sheet was exposed to the electrolyte. The temperature of the aqueous solution was fixed at 80° C. using a thermostatic control throughout the electrodeposition. The electrolyte solution was magnetically stirred with a speed of 100 rpm throughout the electrodeposition process. The anodic electrodeposition of lithium manganese dioxide was conducted by passing a pulse reverse current through the electrodeposition cell for 120 minutes with an adjusted anodic duty cycle of 40%, a frequency of 20 Hz, similar $I_a$ and $I_c$ of 1.00 mAdm$^{-2}$, and a $t_r$ of 20 ms. Afterwards, the deposited lithium manganese dioxide was mechanically removed from the surface of the 316-stainless steel anode and rinsed with distilled water to remove the residuals of the acidic electrolyte. Finally, the obtained powder of lithium manganese dioxide was put into a crucible and heated at 110° C. for 3 hours followed by a calcination at 375° C. with a ramping rate of 1° C./min for 3 hours.

Figure 11A:
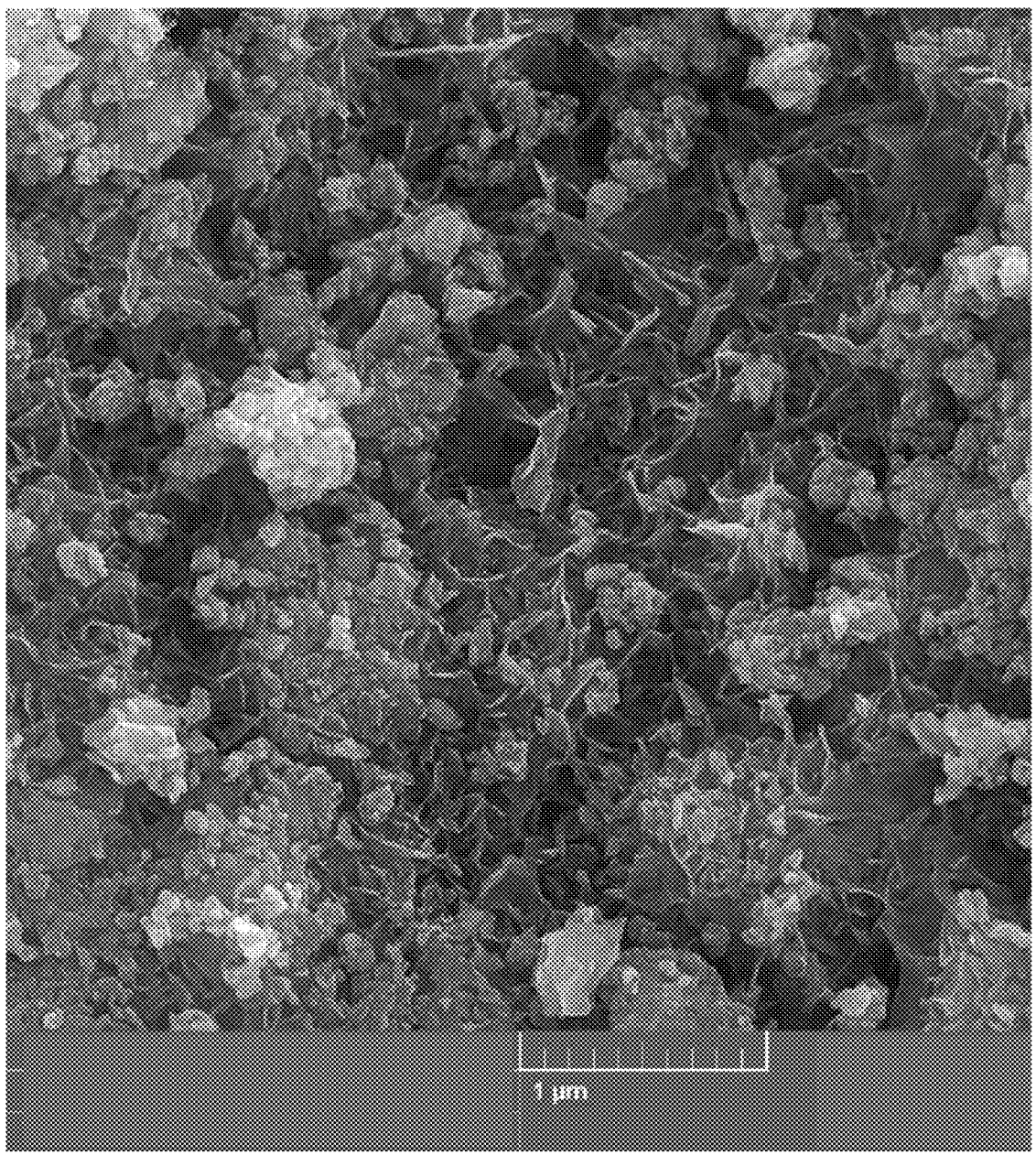
FIG. 11A is an FE-SEM image of the synthesized $Li_{0.52}MnO_2$ at a magnification of 50 kx, according to an implementation of the present disclosure.
Figure 11B:
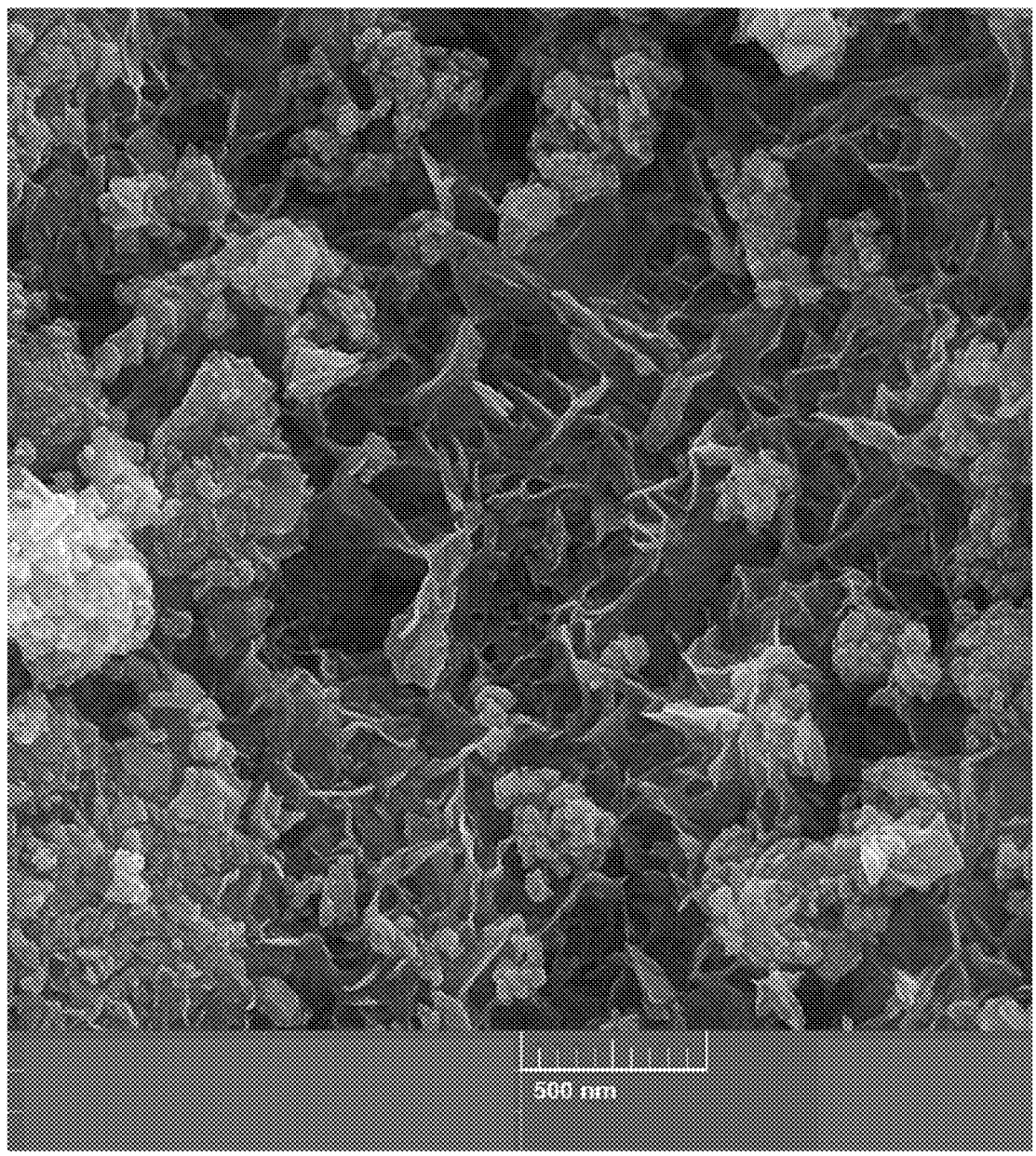
FIG. 11B is an FE-SEM image of the synthesized $Li_{0.52}MnO_2$ at a magnification of 75 kx, according to an implementation of the present disclosure.
Figure 11C:
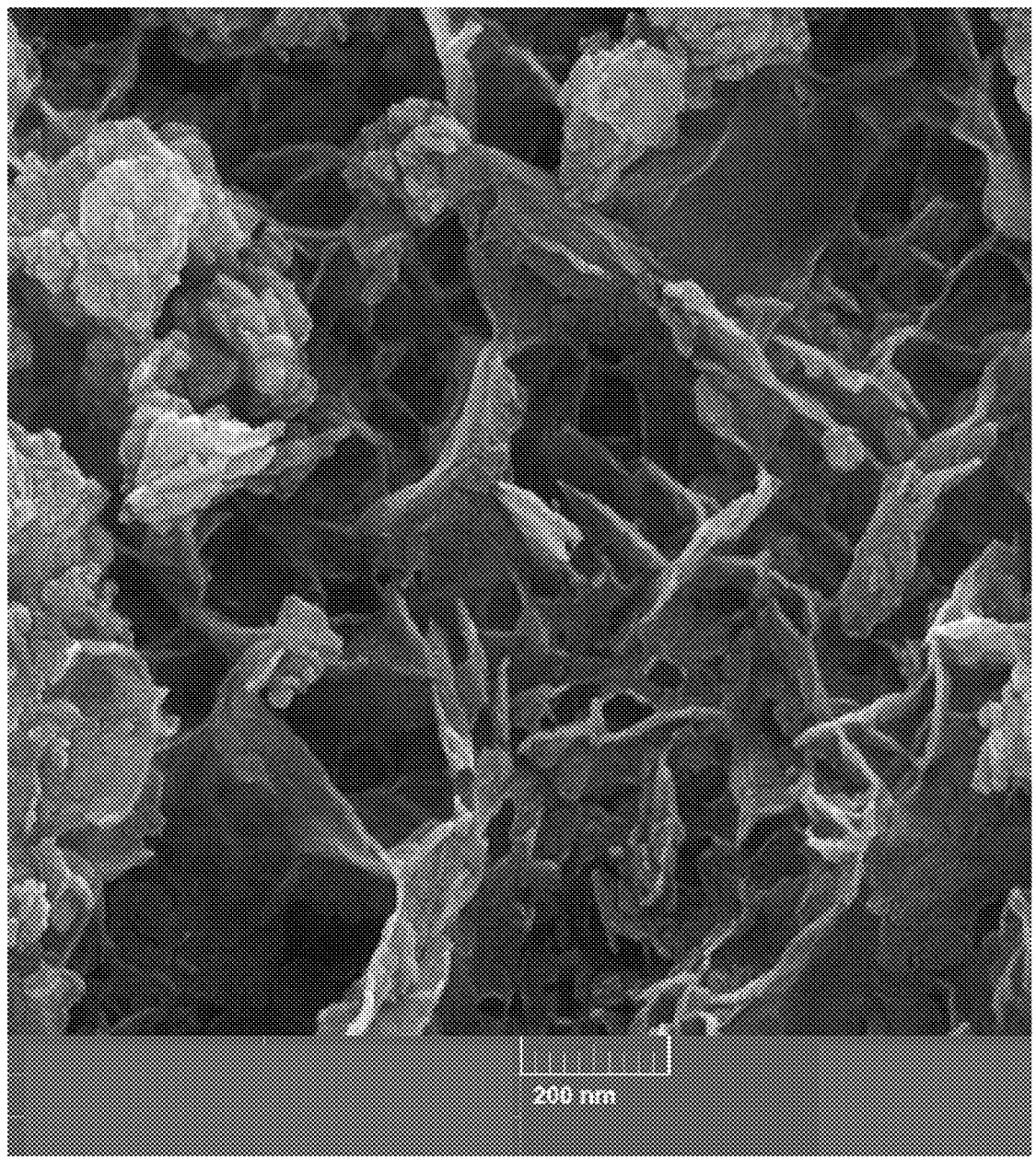
FIG. 11C is an FE-SEM image of the synthesized $Li_{0.52}MnO_2$ at a magnification of 150 kx, according to an implementation of the present disclosure.

FIGS. 11A-11C are field emission scanning electron microscope (FE-SEM) images of the synthesized $Li_{0.52}MnO_2$ at different magnifications. FIG. 11A is an FE-SEM image of the synthesized $Li_{0.52}MnO_2$ at a magnification of 50 kx. FIG. 11B is an FE-SEM image of the synthesized $Li_{0.52}MnO_2$ at a magnification of 75 kx. FIG. 11C is an FE-SEM image of the synthesized $Li_{0.52}MnO_2$ at a magnification of 150 kx. Referring to FIGS. 11A-11C, the morphology of the synthesized $Li_{0.52}MnO_2$ contains cross-linked nano-walls creating 3D networks within the structure.

Figure 12A:
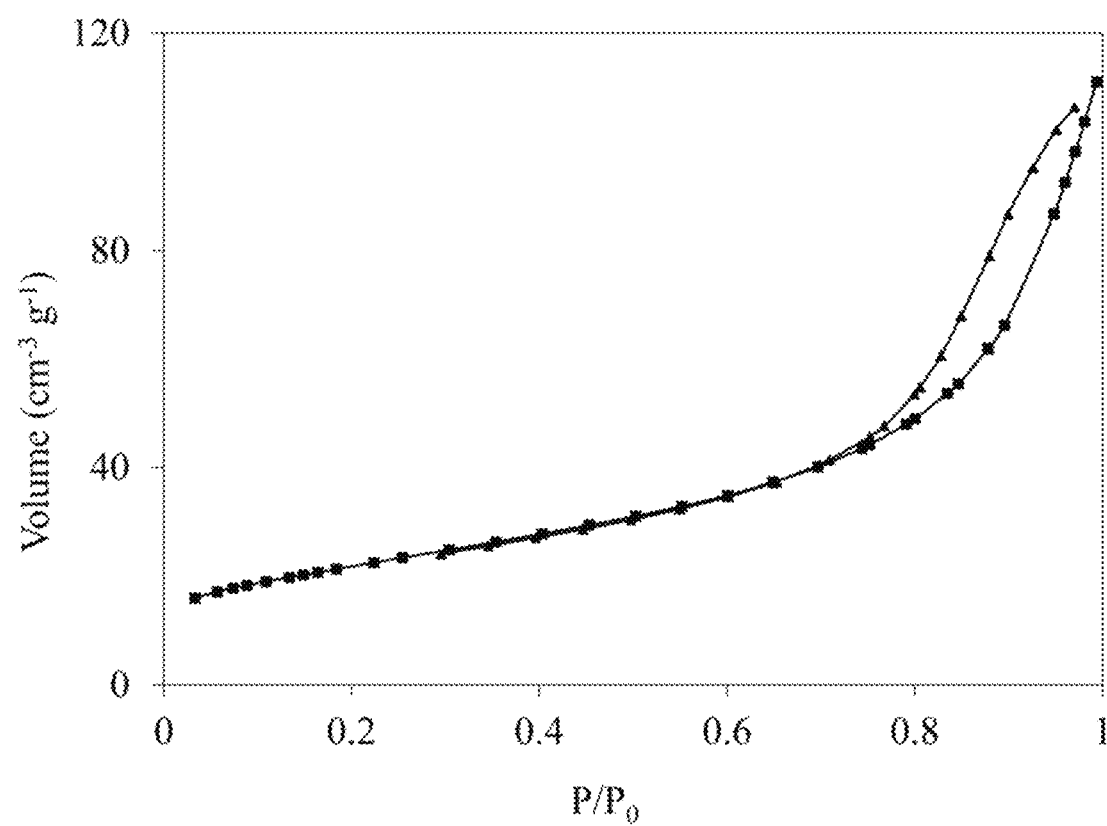
FIG. 12A illustrates an $N_2$ adsorption-desorption isotherm of the synthesized $Li_{0.52}MnO_2$, according to an implementation of the present disclosure.
Figure 12B:
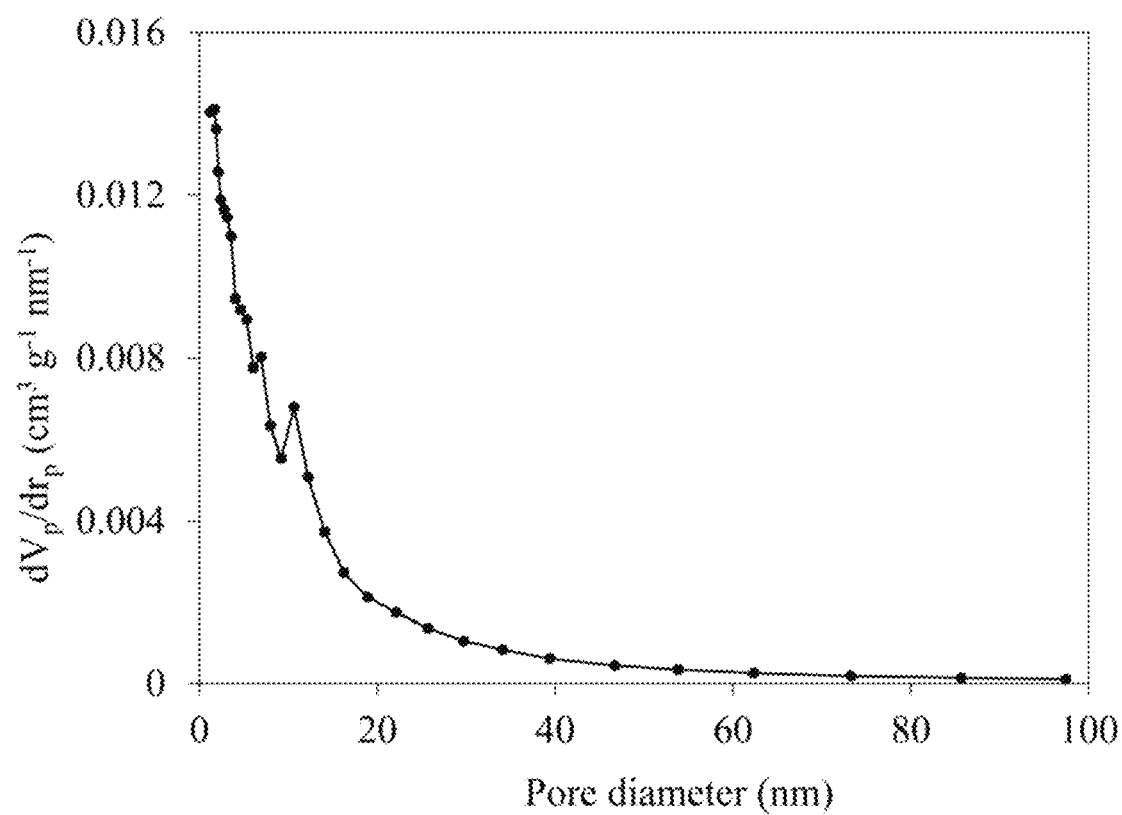
FIG. 12B illustrates a pore size distribution that is calculated from the nitrogen sorption isotherm of the synthesized $Li_{0.52}MnO_2$, according to an implementation of the present disclosure.

FIG. 12A illustrates an $N_2$ adsorption-desorption isotherm of the synthesized $Li_{0.52}MnO_2$. Referring to FIG. 12A, a typical type IV classification with an H3 hysteresis loop can be observed, which is an obvious characteristic of the mesoporous structure and confirms the mesoporous structure of the synthesized $Li_{0.52}MnO_2$. FIG. 12B illustrates a correspondent pore size distribution calculated from the nitrogen sorption isotherm of the synthesized $Li_{0.52}MnO_2$, which shows a narrow pore size distribution centered at 10.63 nm.

Example 6

Synthesizing $Li_{0.58}MnO_2$

In this example, $Li_{0.58}MnO_2$ is synthesized by first preparing an aqueous solution containing $Li_2SO_4$ as a lithium ion source and $MnSO_4$ as a manganese ion source with a $Li_+:Mn^{2+}$ ratio of 10:1. This ratio is kept constant throughout the anodic electrodeposition process. The pH of the prepared aqueous solution was fixed at 6 by adding appropriate amounts of a sulfuric acid solution. The prepared aqueous solution was transferred to an electrodeposition bath. The electrodeposition bath included a 316-stainless steel anode electrode surrounded by two lead cathode sheets. Here, 1.00 dm$^2$ of the anode sheet was exposed to the electrolyte. The temperature of the aqueous solution was fixed at 80° C. using a thermostatic control throughout the electrodeposition. The electrolyte solution was magnetically stirred with a speed of 100 rpm throughout the electrodeposition process. The anodic electrodeposition of lithium manganese dioxide was conducted by passing a pulse reverse current through the electrodeposition cell for 120 minutes with an adjusted anodic duty cycle of 36.36%, a frequency of 18.18 Hz, similar $I_a$ and $I_c$ of 1.00 mAdm$^{-2}$, and a $t_r$ of 20 ms.

Afterwards, the deposited lithium manganese dioxide was mechanically removed from the surface of the 316-stainless steel anode and rinsed with distilled water to remove the residuals of the acidic electrolyte. Finally, the obtained powder of lithium manganese dioxide was put into a crucible and heated at 110° C. for 3 hours followed by a calcination at 375° C. with a ramping rate of 1° C./min for 3 hours.

Figure 13A:
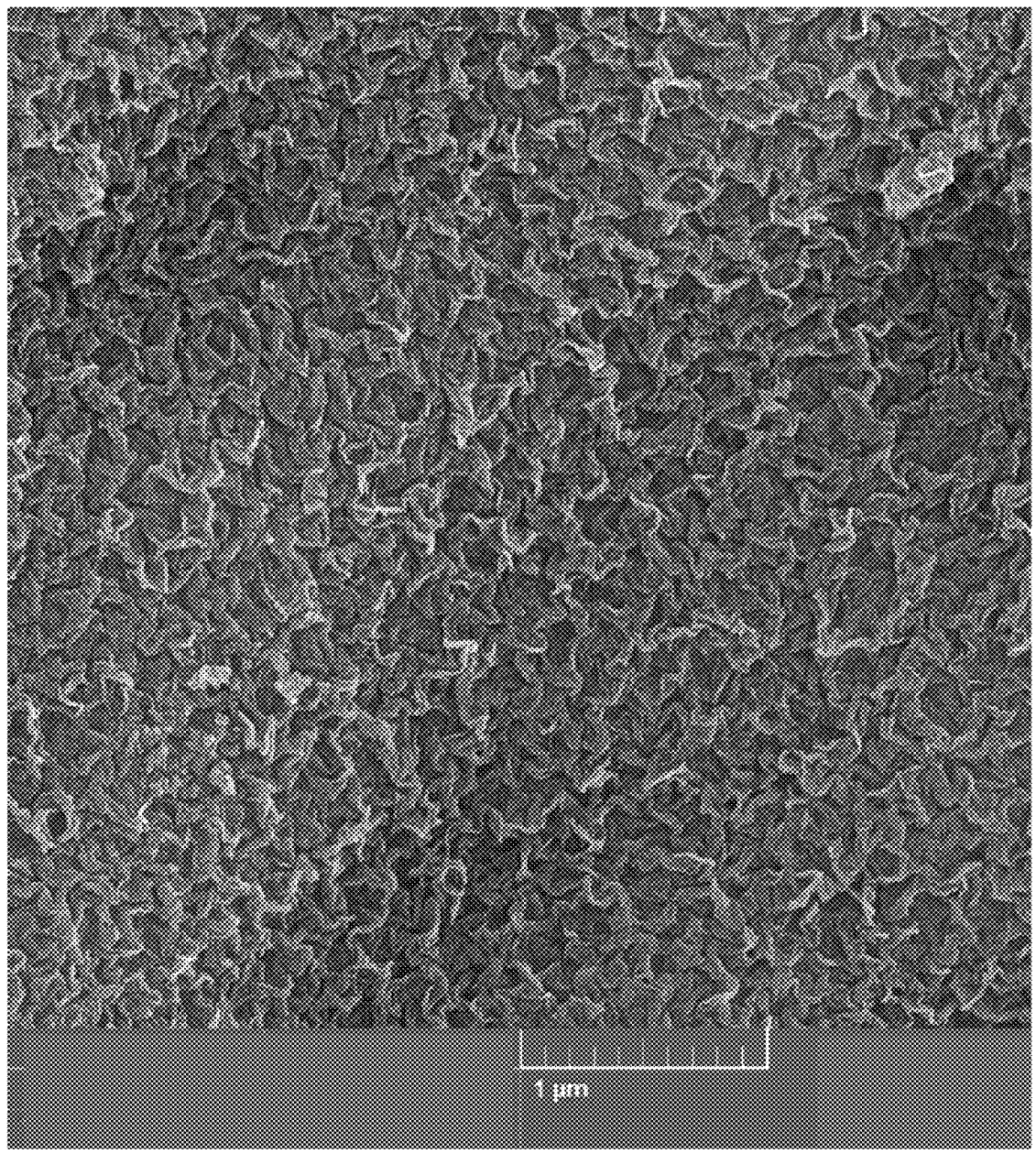
FIG. 13A is an FE-SEM image of the synthesized $Li_{0.58}MnO_2$ at a magnification of 50 kx, according to an implementation of the present disclosure.
Figure 13B:
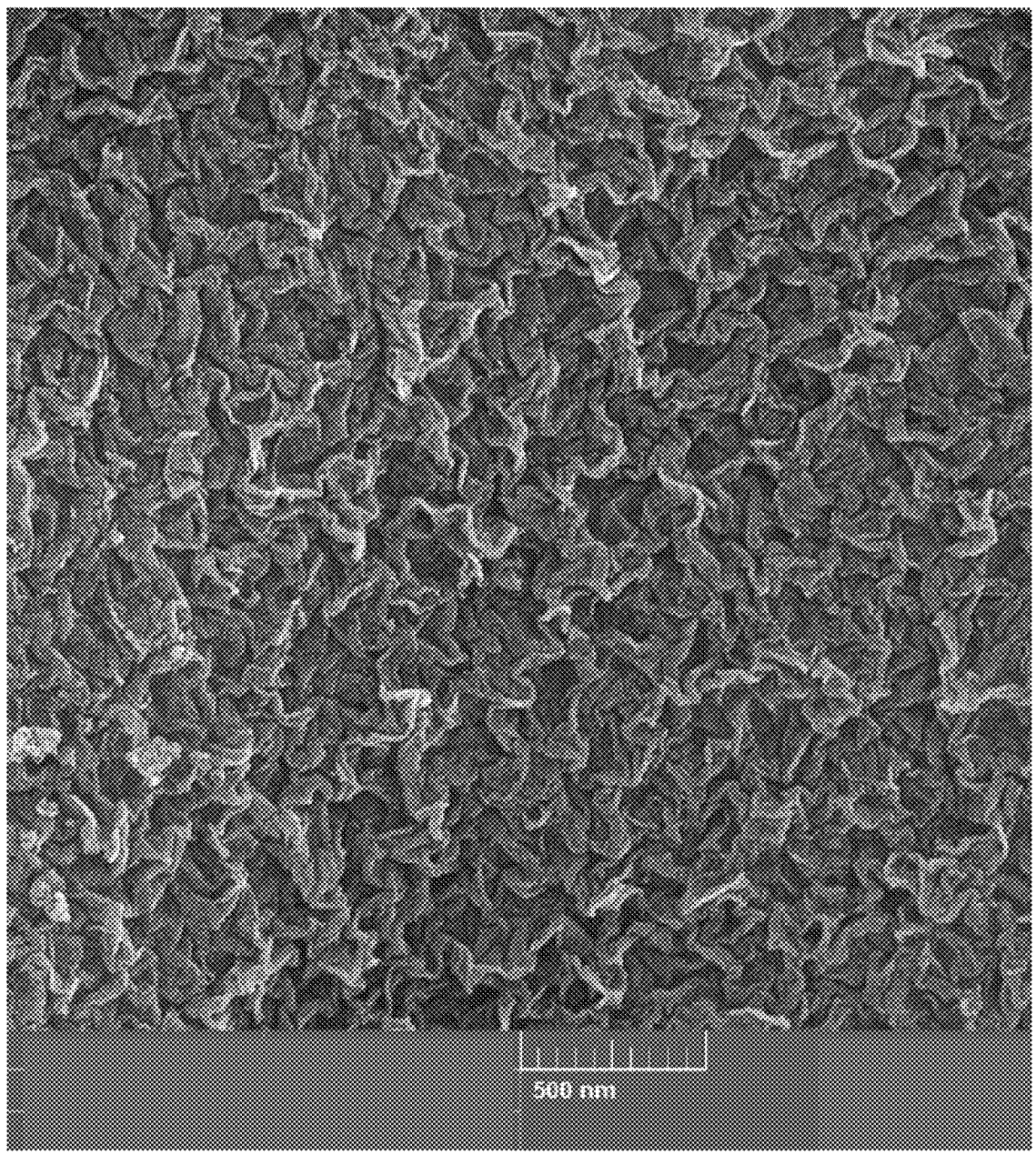
FIG. 13B is an FE-SEM image of the synthesized $Li_{0.58}MnO_2$ at a magnification of 75 kx, according to an implementation of the present disclosure.
Figure 13C:
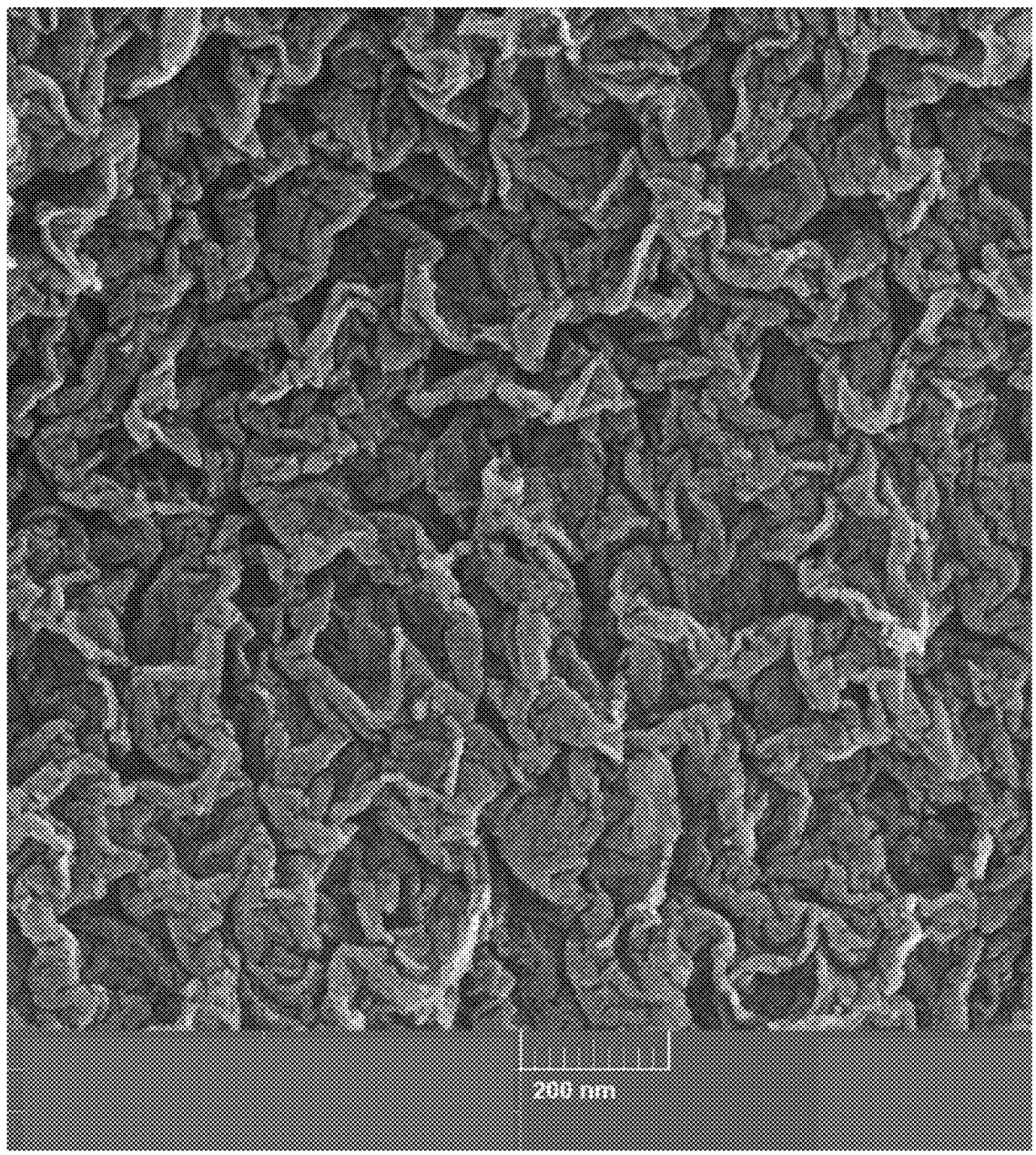
FIG. 13C is an FE-SEM image of the synthesized $Li_{0.58}MnO_2$ at a magnification of 150 kx, according to an implementation of the present disclosure.

FIGS. 13A-13C are field emission scanning electron microscope (FE-SEM) images of the synthesized $Li_{0.58}MnO_2$ at different magnifications. FIG. 13A is an FE-SEM image of the synthesized $Li_{0.58}MnO_2$ at a magnification of 50 kx. FIG. 13B is an FE-SEM image of the synthesized $Li_{0.58}MnO_2$ at a magnification of 75 kx. FIG. 13C is an FE-SEM image of the synthesized $Li_{0.58}MnO_2$ at a magnification of 150 kx. Referring to FIGS. 13A-13C, the morphology of the synthesized $Li_{0.58}MnO_2$ contains hierarchical interconnected nano-flakes.

Figure 14A:
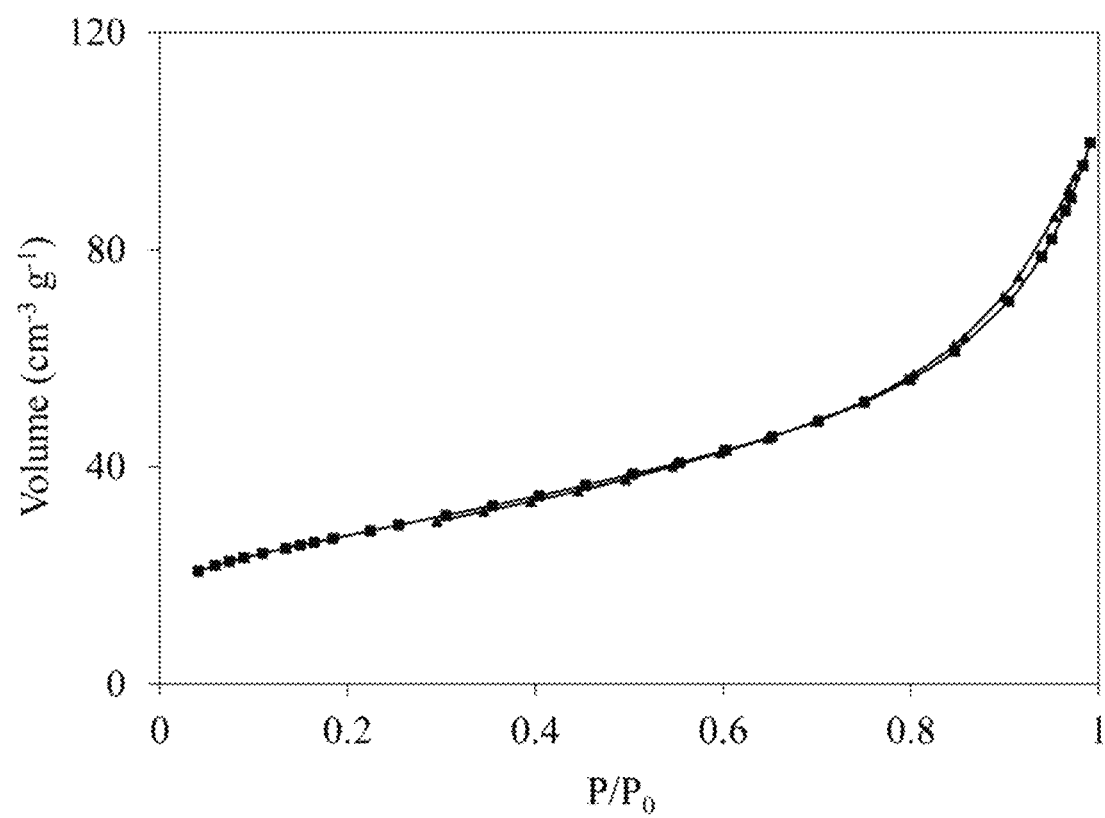
FIG. 14A illustrates an $N_2$ adsorption-desorption isotherm of the synthesized $Li_{0.58}MnO_2$, according to an implementation of the present disclosure.
Figure 14B:
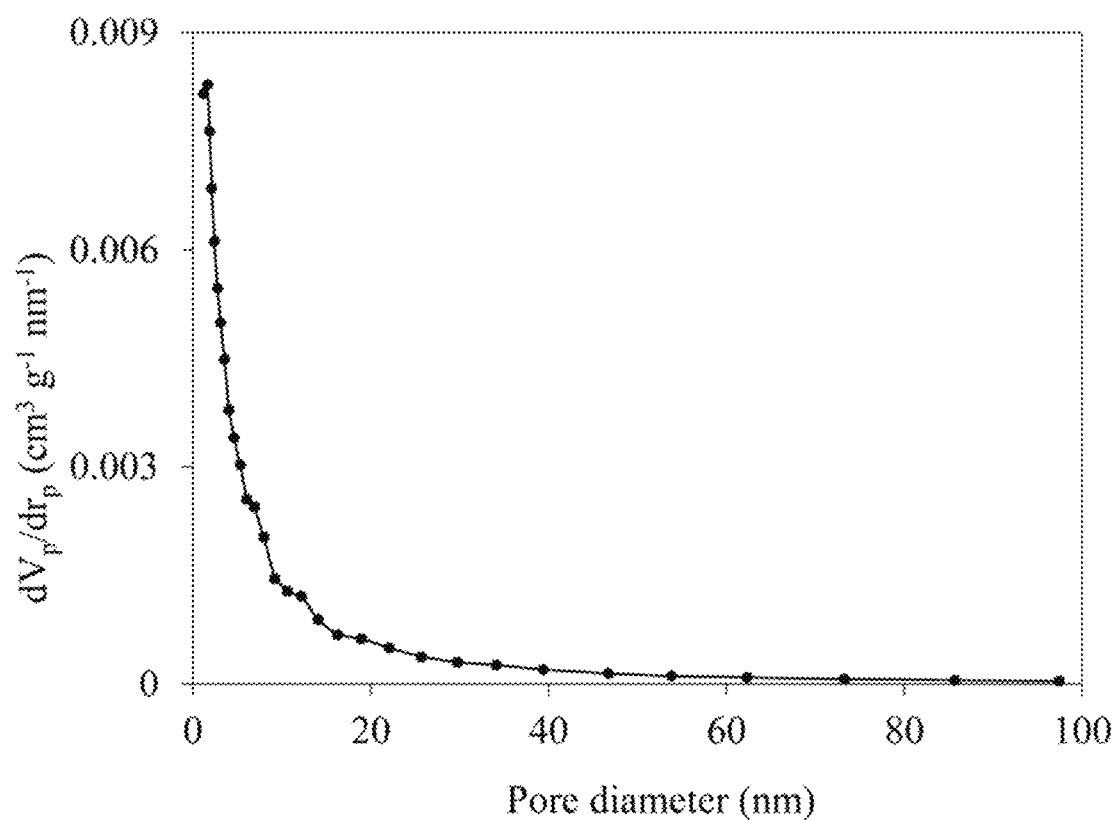
FIG. 14B illustrates a pore size distribution that is calculated from the nitrogen sorption isotherm of the synthesized $Li_{0.58}MnO_2$, according to an implementation of the present disclosure.

FIG. 14A illustrates an $N_2$ adsorption-desorption isotherm of the synthesized $Li_{0.58}MnO_2$. Referring to FIG. 14A, a typical type IV classification with an H3 hysteresis loop can be observed, which is an obvious characteristic of the mesoporous structure and confirms the mesoporous structure of the synthesized $Li_{0.58}MnO_2$. FIG. 14B illustrates a correspondent pore size distribution calculated from the nitrogen sorption isotherm of the synthesized $Li_{0.58}MnO_2$, which shows a narrow pore size distribution centered at 6.94 nm.

Example 7

Li-ion Battery Performance Tests

Figure 15:
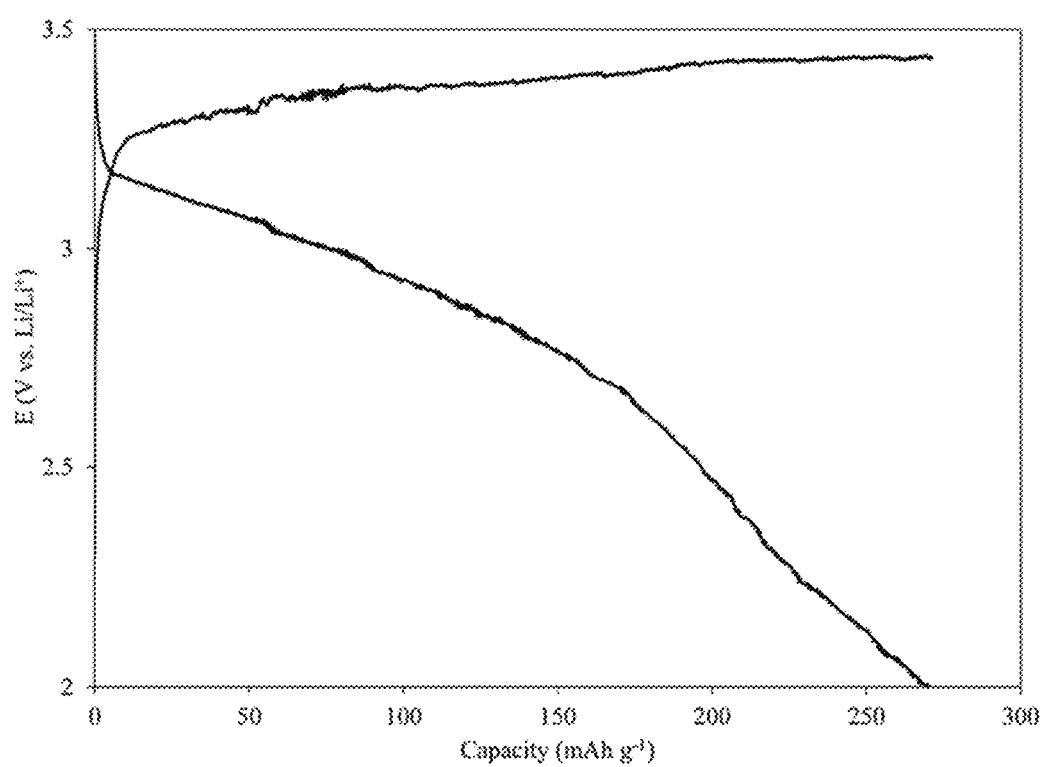
FIG. 15 illustrates a charge-discharge profile of a coin cell Li-ion battery including a cathode with $Li_{0.22}MnO_2$ as its active material, according to an implementation of the present disclosure.

In this example, Li-ion batteries utilizing the synthesized lithium manganese dioxide samples of Examples 1-6 as their cathodes are prepared and tested for performance. Each of the Li-ion batteries includes a cathode including an active material consisting of a sample of a lithium manganese dioxide, an anode, an electrolyte and a separator. The cathodes were prepared according to the following procedure: slurries of the provided lithium manganese dioxide samples of Examples 1-6 as active material powder (85%), graphite (10%) and polyvinylidene fluoride (PVDF) as a binder, (5%) were dispersed in 1-methyl 2-pyrrolidone (NMP) solvent and coated on aluminum foil substrates. Afterwards, the electrodes were pressed and dried at 110° C. for 12 hours under vacuum. Coin-type Li-ion cells including a cathode with active material of the provided lithium manganese dioxide of Examples 1-6, were assembled in an argon-filled glove-box (with less than 1 ppm $O_2$ and $H_2O$ levels) with lithium foil as anode separated by Celgard 2400 polypropylene porous film from the cathode. A 1.0 M solution of $LiClO_4$ in propylene carbonate (PC) was used as the electrolyte. In this example, a current collector is used as a support of the active material and conductive agent. The current collector of the cathode used in the Li-ion battery may be aluminum. The binder which binds the conductive agent and the active material to fix them on the current collector may be polyvinylidene fluoride (PVDF). The conductive agent may be with appropriate conductivity and chemical un-reactivity. In this example, both the anode and the cathode are disposed to a non-aqueous liquid electrolyte solution. The non-aqueous liquid electrolyte solution includes an organic solvent and a lithium salt dissolved in the organic solvent. The non-aqueous organic solvent which allows lithium ions to move between the anode and the cathode may be propylene carbonate (PC). The lithium salt as a source of lithium ions in the organic solvent may include $LiClO_4$. Furthermore, in this example, a separator should be inserted between the cathode and the anode to prevent short circuit there between. The separator may include poly olefins like poly propylene FIG. 15 illustrates a charge-discharge profile of a coin cell Li-ion battery including a cathode with $Li_{0.22}MnO_2$ as its active material, according to an implementation of the present disclosure. Referring to FIG. 15, a Li-ion coin cell including the cathode with active material of provided $Li_{0.22}MnO_2$, is able to deliver a first discharge capacity of 269.03 mAh/g and retain 75.45% of the first discharge capacity after 300 successive charge-discharge cycles.

Figure 16:
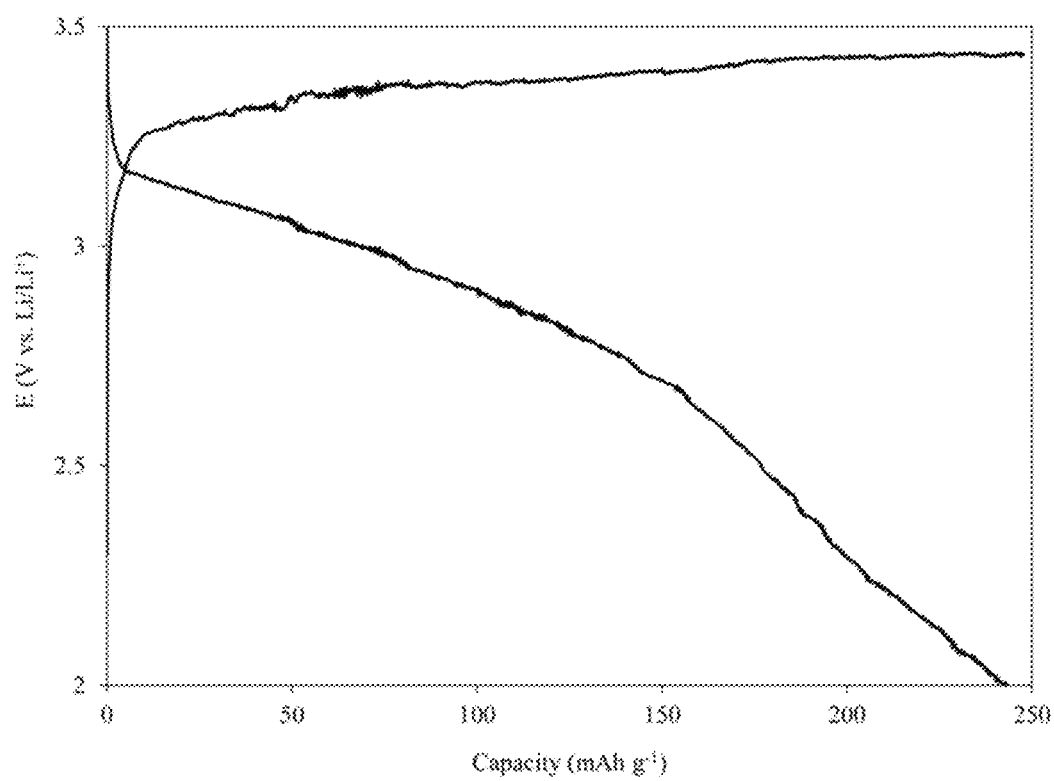
FIG. 16 illustrates a charge-discharge profile of a coin cell Li-ion battery including a cathode with $Li_{0.36}MnO_2$ as its active material, according to an implementation of the present disclosure.

FIG. 16 illustrates a charge-discharge profile of a coin cell Li-ion battery including a cathode with $Li_{0.36}MnO_2$ as its active material, according to an implementation of the present disclosure. Referring to FIG. 16, a Li-ion coin cell with a cathode with a $Li_{0.36}MnO_2$ as its active material, is able to deliver a first discharge capacity of 279.9 mAh/g and retain 73.24% of the first discharge capacity after 300 successive charge-discharge cycles.

Figure 17:
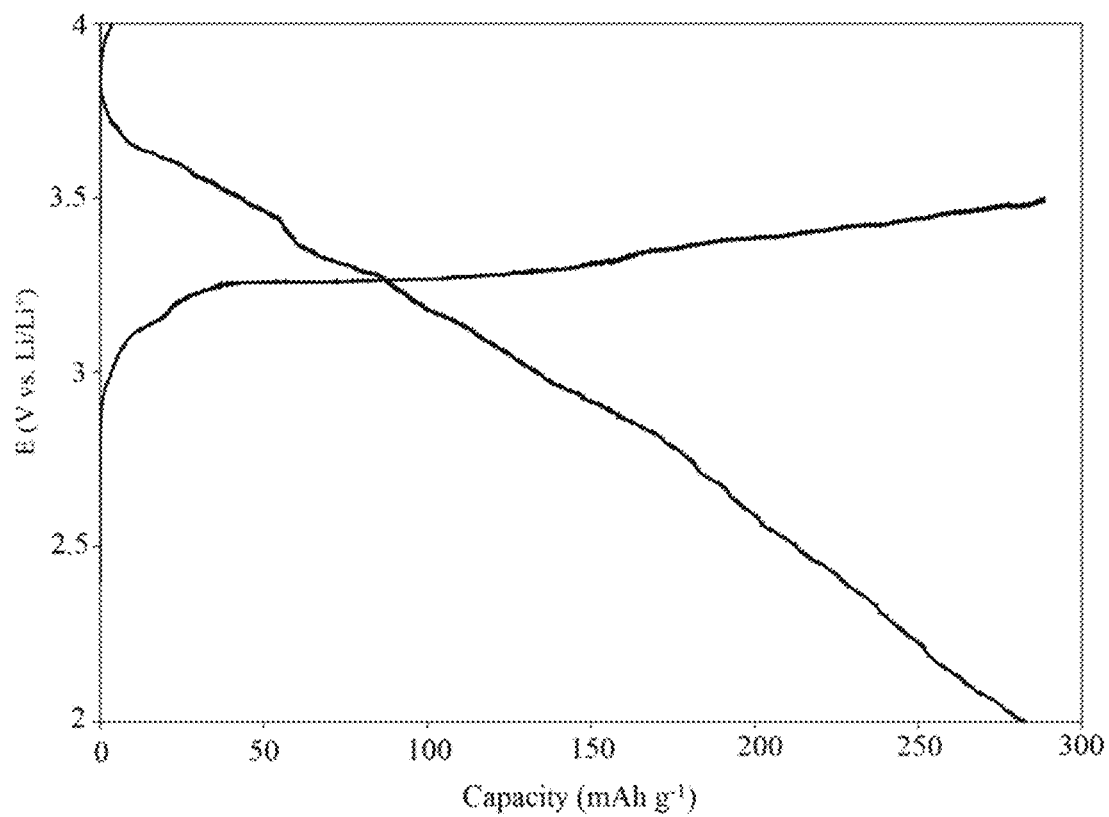
FIG. 17 illustrates a charge-discharge profile of a coin cell Li-ion battery including a cathode with $Li_{0.65}MnO_2$ as its active material, according to an implementation of the present disclosure.

FIG. 17 illustrates a charge-discharge profile of a coin cell Li-ion battery including a cathode with $Li_{0.65}MnO_2$ as its active material, according to an implementation of the present disclosure. Referring to FIG. 17, a Li-ion coin cell including a cathode with $Li_{0.65}MnO_2$ as its active material, is able to deliver a first discharge capacity of 282.32 mAh/g, and retain 88.30% of the first discharge capacity after 300 successive charge-discharge cycles.

Figure 18:
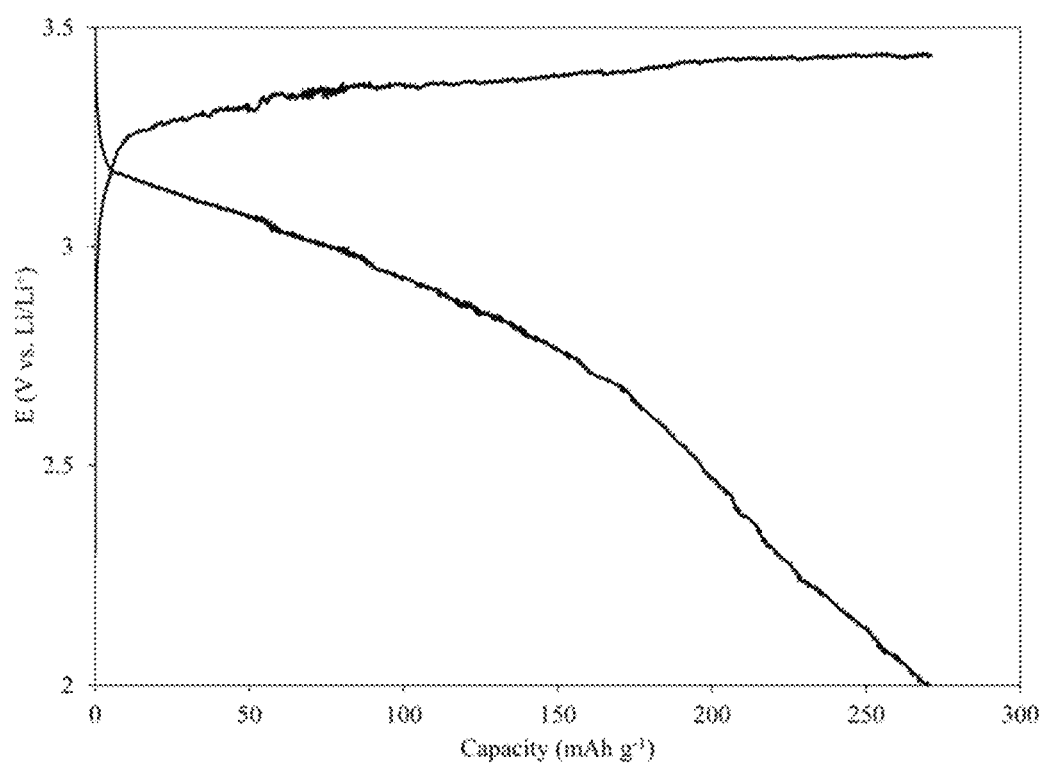
FIG. 18 illustrates a charge-discharge profile of a coin cell Li-ion battery including a cathode with $Li_{0.34}MnO_2$ as its active material, according to an implementation of the present disclosure.

FIG. 18 illustrates a charge-discharge profile of a coin cell Li-ion battery including a cathode with $Li_{0.34}MnO_2$ as its active material, according to an implementation of the present disclosure. Referring to FIG. 18, a Li-ion coin cell including a cathode with $Li_{0.34}MnO_2$ as its active material, is able to deliver a first discharge capacity of 242.95 mAh/g and retain 81.91% of the first discharge capacity after 300 successive charge-discharge cycles.

Figure 19:
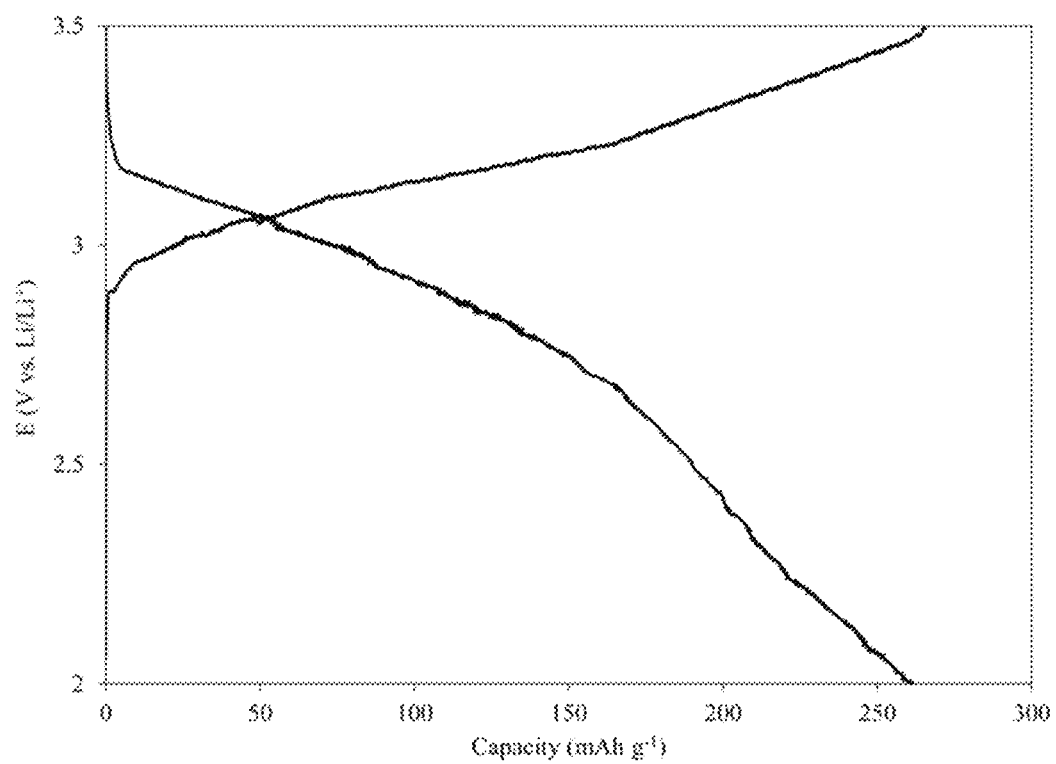
FIG. 19 illustrates a charge-discharge profile of a coin cell Li-ion battery including a cathode with $Li_{0.52}MnO_2$ as its active material, according to an implementation of the present disclosure.

FIG. 19 illustrates a charge-discharge profile of a coin cell Li-ion battery including a cathode with $Li_{0.52}MnO_2$ as its active material, according to an implementation of the present disclosure. Referring to FIG. 19, a Li-ion coin cell including a cathode with $Li_{0.52}MnO_2$ as its active material, is able to deliver a first discharge capacity of 275.28 mAh/g and retain 79.25% of the first discharge capacity after 300 successive charge-discharge cycles.

Figure 20:
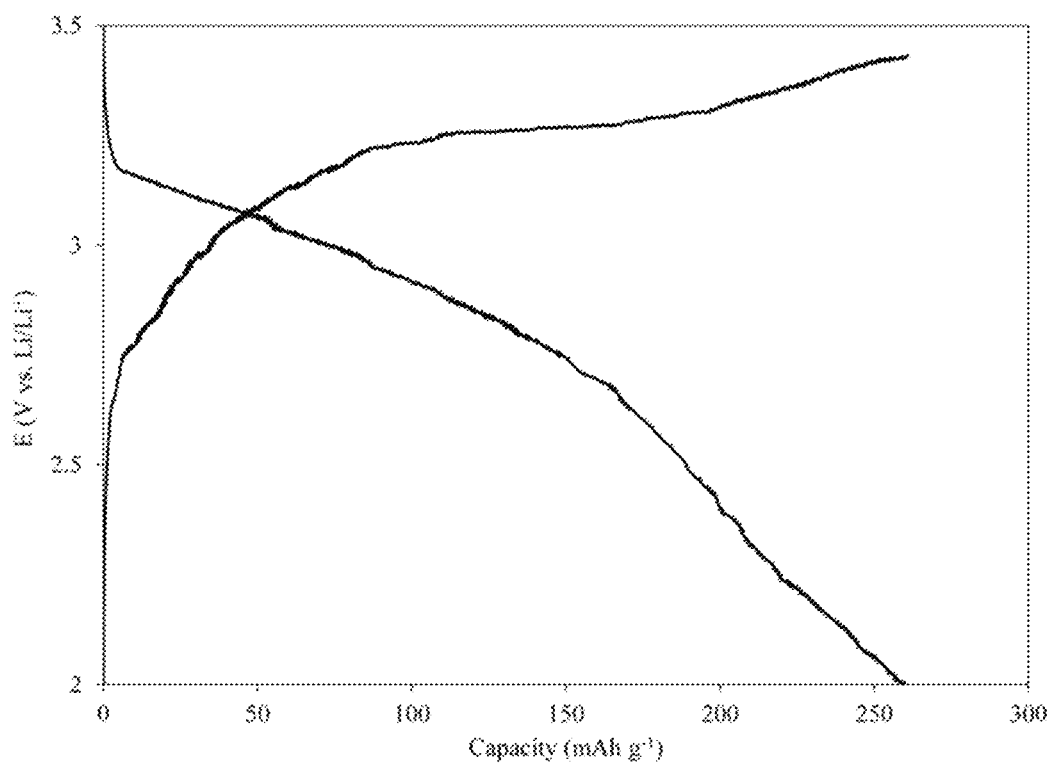
FIG. 20 illustrates a charge-discharge profile of a coin cell Li-ion battery including a cathode with $Li_{0.58}MnO_2$ as its active material, according to an implementation of the present disclosure.

FIG. 20 illustrates a charge-discharge profile of a coin cell Li-ion battery including a cathode with $Li_{0.58}MnO_2$ as its active material, according to an implementation of the present disclosure. Referring to FIG. 20, a Li-ion coin cell including a cathode with $Li_{0.58}MnO_2$ as its active material, is able to deliver a first discharge capacity of 259.71 mAh/g and retain 76.00% of the first discharge capacity after 300 successive charge-discharge cycles.

Table 1 lists the properties of the synthesized lithium manganese dioxides as cathode materials in a Li-ion battery as described in connection with Example 7. Referring to Table 1, higher specific surface areas or in other words BET surface areas of the provided lithium manganese dioxide samples may cause a higher electrochemical performance of lithium manganese dioxide in terms of the first discharge capacity and cyclability.

TABLE 1

Properties of the synthesized lithium manganese dioxides as cathode materials in a Li-ion battery.

| Sample | $Li^+$ (%) | BET surface area ($m^2 g^{-1}$) | The first discharge capacity (mAh $g^{-1}$) | Discharge capacity after 300 Cycles (mAh $g^{-1}$) | Capacity retention (%) |
|---|---|---|---|---|---|
| $Li_{0.22}MnO_2$ | 1.09 | 260.23 | 269.03 | 203.0 | 75.45 |
| $Li_{0.36}MnO_2$ | 1.78 | 264.02 | 279.90 | 205.0 | 73.24 |
| $Li_{0.65}MnO_2$ | 3.12 | 320.12 | 282.32 | 249.3 | 81.91 |
| $Li_{0.34}MnO_2$ | 1.69 | 250.12 | 242.95 | 199.0 | 81.91 |
| $Li_{0.52}MnO_2$ | 2.58 | 275.28 | 261.18 | 207.0 | 79.25 |
| $Li_{0.58}MnO_2$ | 2.88 | 238.12 | 259.71 | 197.4 | 76.00 |

While the foregoing has described what are considered to be the best mode and/or other examples, it is understood that various modifications may be made therein and that subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for synthesizing mesoporous lithium manganese dioxide micro/nanostructures, the method comprising:
   preparing an aqueous metal salt solution by dissolving a lithium ion source and a manganese ion source in water; and
   subjecting the aqueous metal salt solution to an anodic electrodeposition process by:
      transferring the aqueous metal salt solution to an electrodeposition bath containing an anode electrode and a cathode electrode, the anode electrode and the cathode electrode being immersed in the transferred aqueous metal salt solution; and
      applying a pulse reverse current through the electrodeposition bath to obtain lithium manganese dioxide deposited on a surface of the anode electrode.

2. The method according to claim 1, wherein applying the pulse reverse current through the electrodeposition bath includes applying a modulated pulse reverse current with an anodic duty cycle adjustable between 20% and 90%, a cathodic duty cycle adjustable between 3% and 50%, and a frequency adjustable between 5 Hz and 500 Hz.

3. The method according to claim 2, wherein applying the modulated pulse reverse current includes applying the modulated pulse reverse current with an adjustable anodic pulse width of between 5 µs and 100 ms and an adjustable cathodic pulse width of between 1 µs and 95 ms.

4. The method according to claim 3, wherein applying the modulated pulse reverse current includes applying the modulated pulse reverse current with an adjustable anodic peak current density and an adjustable cathodic peak current density of between 100 $\mu Adm^{-2}$ and 10 $Adm^{-2}$.

5. The method according to claim 1, wherein subjecting the aqueous metal salt solution to the anodic electrodeposition process further includes concurrently stirring the aqueous metal salt solution in the electrodeposition bath.

6. The method according to claim 5, wherein stirring the aqueous metal salt solution in the electrodeposition bath includes stirring the aqueous metal salt solution in the electrodeposition bath with a speed of 20 to 600 rpm.

7. The method according to claim 1, further comprising adjusting pH of the aqueous metal salt solution to between 2.0 and 6.5.

8. The method according to claim 1, further comprising removing the obtained lithium manganese dioxide from the surface of the anode electrode.

9. The method according to claim 1, further comprising:
   heating the obtained lithium manganese dioxide at a first temperature in a range of 100° C. to 200° C.;
   increasing the first temperature to a second temperature with a slope of between 1° C./min. and 10° C./min.; and
   heating the obtained lithium manganese dioxide at the second temperature in a range of 300° C. to 500° C.

10. The method according to claim 9, wherein heating the obtained lithium manganese dioxide at the first temperature in a range of 100° C. to 200° C. includes heating the obtained lithium manganese dioxide at the first temperature in a range of 100° C. to 200° C. for a first period of 60 min. to 12 hours.

11. The method according to claim 9, wherein heating the obtained lithium manganese dioxide at the second temperature in a range of 300° C. to 500° C. includes heating the obtained lithium manganese dioxide at the second temperature in a range of 300° C. to 500° C. for a second period of 180 min. to 14 hours.

12. The method according to claim 1, wherein temperature of the electrodeposition bath is kept between 70° C. and 100° C.

13. The method according to claim 1, wherein applying the pulse reverse current through the electrodeposition bath includes applying the pulse reverse current through the electrodeposition bath for a period of 30 min. to 24 hours.

14. The method according to claim 1, wherein the lithium salt is selected from the group consisting of lithium hydroxide, lithium carbonate, lithium sulfate, lithium nitrate, lithium bromide, lithium chloride, lithium perchlorate, lithium acetate, lithium oxalate, and combinations thereof.

15. The method according to claim 1, wherein the manganese salt is selected from the group consisting of manganese bromide, manganese carbonate, manganese chloride, manganese nitrate, manganese sulfate, manganese perchlorate, manganese acetate and manganese oxalate, and combinations thereof.

16. The method according to claim 1, wherein adjusting pH of the aqueous metal salt solution between 2.0 and 6.5 includes adding a specific amount of an acid solution, the acid solution selected from the group consisting of sulfuric acid, hydrochloric acids, acetic acid, perchloric acid, and combinations thereof.

17. The method according to claim 1, wherein the cathode electrode includes a sheet made of any one of lead, stainless steel, graphite, platinum, platinum-coated substrates, gold, and gold-coated substrates.

18. The method according to claim 1, wherein the anode electrode includes a sheet made of any one of titanium, stainless steel, platinum, platinum-coated substrates, gold, and gold-coated substrates.

* * * * *